US010547260B2

(12) United States Patent
Liao et al.

(10) Patent No.: US 10,547,260 B2
(45) Date of Patent: *Jan. 28, 2020

(54) OFF-GRID POWER GENERATING APPARATUS

(71) Applicant: Chongqing HEYA Technology Co., Ltd., Chongqing (CN)

(72) Inventors: Yong Liao, Chongqing (CN); Huaping Tang, Chongqing (CN); Weijia Zhang, Chongqing (CN); Meichang Xie, Chongqing (CN)

(73) Assignee: CHONGQING HEYA TECHNOLOGY CO., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,776

(22) Filed: Jun. 7, 2018

(65) Prior Publication Data

US 2019/0229658 A1    Jul. 25, 2019

(30) Foreign Application Priority Data

Jan. 25, 2018   (CN) .......................... 2018 1 0073129

(51) Int. Cl.
| | |
|---|---|
| *H02P 7/00* | (2016.01) |
| *H02P 9/44* | (2006.01) |
| *H02K 3/28* | (2006.01) |
| *H02P 9/30* | (2006.01) |
| *H02J 9/06* | (2006.01) |

(Continued)

(52) U.S. Cl.
CPC .................. *H02P 9/44* (2013.01); *H02J 3/14* (2013.01); *H02J 9/066* (2013.01); *H02K 1/12* (2013.01); *H02K 1/22* (2013.01); *H02K 3/28* (2013.01); *H02P 9/008* (2013.01); *H02P 9/305* (2013.01); *H02J 2003/143* (2013.01)

(58) Field of Classification Search
CPC .. H02P 9/44; H02P 9/008; H02P 9/305; H02J 3/14; H02J 9/066; H02K 1/12; H02K 1/22; H02K 3/28
USPC ........................................................ 318/158
See application file for complete search history.

(56) References Cited

U.S. PATENT DOCUMENTS

| | | | | |
|---|---|---|---|---|
| 4,994,684 | A * | 2/1991 | Lauw ........................ | H02P 9/42 290/40 C |
| 2004/0021437 | A1* | 2/2004 | Maslov ..................... | B60L 8/00 318/400.01 |

(Continued)

*Primary Examiner* — Bickey Dhakal
*Assistant Examiner* — Gabriel Agared
(74) *Attorney, Agent, or Firm* — Hamre, Schumann, Mueller & Larson, P.C.

(57) ABSTRACT

A power generating apparatus is provided. The alternator includes a rotor, a stator, one or more sensors and an electrical circuit. The rotor includes a plurality of symmetric phase windings while the stator has a single phase winding. The excitation control device is configured to control the induced voltage generated in the stator by regulating the rotating magnetic field generated in the phase windings of the rotor. The excitation control device is also configured to regulate the engine speed responsive to calculated load power. The electrical circuit connects the single phase winding of the stator and the load and is configured in a way that the induced voltage generated in the single phase winding and the output voltage applied to the load are at the same frequency. This arrangement reduces costs of the apparatus.

16 Claims, 24 Drawing Sheets

(51) Int. Cl.
  *H02K 1/12* (2006.01)
  *H02P 9/00* (2006.01)
  *H02J 3/14* (2006.01)
  *H02K 1/22* (2006.01)

(56) References Cited

U.S. PATENT DOCUMENTS

| | | | |
|---|---|---|---|
| 2005/0162106 A1* | 7/2005 | Cho | B60K 6/46 318/139 |
| 2008/0238108 A1* | 10/2008 | Edelson | B60W 10/06 290/40 C |
| 2009/0236860 A1* | 9/2009 | Raasch | F02D 29/06 290/40 B |
| 2009/0295169 A1* | 12/2009 | Usselman | F02B 63/04 290/1 A |
| 2015/0180367 A1* | 6/2015 | Tesch | H02P 9/009 363/95 |

* cited by examiner

OFF-GRID POWER GENERATING APPARATUS

CROSS-REFERENCE TO RELATED APPLICATION

This application claims priority to Chinese Patent Application No. 201810073129.3, entitled "Off-Grid Power Generating Apparatus and Portable Generator Set" filed on Jan. 25, 2018, which is incorporated by reference in its entirety.

BACKGROUND

An off-grid generator set is a power generating system whose connection to an electrical power grid is temporarily or permanently unavailable. Off-grid generator sets have been widely used. For example, a portable/standby generator set may be utilized to power electrical equipment connected via a circuit with the generator set when people do camping, tailgating and working outside. A similar power generating apparatus is also utilized to provide backup power in emergencies, for example during blackout.

The generator set usually utilizes a driving engine coupled to an alternator (or generator) through a common shaft. Upon actuation of the engine, the engine rotates the common shaft to drive the alternator that, in turn, generates electrical power. Most residential electric equipment is designed to be used in connection with electrical power having a fixed frequency, for example, 60 hertz (Hz) in North America and 50 Hz in China. The frequency of the output electrical power is determined by the operating speed of the engine. As a result, the engine's operating speed of some generator sets is fixed as so to keep the output electrical power at a fixed frequency. However, when an electrical load applied to the generator set is less than the rated kilowatt load for which the generator set is designed, the engine's fuel-efficiency deteriorates and the generator set generates loud noise.

It is therefore desirable to have a generator set or power generating apparatus that allows a variable engine speed, an output voltage with a constant amplitude and a constant frequency.

SUMMARY

Embodiments of off-grid power generating apparatus are described. In accordance with some embodiments, the power generating apparatus includes an alternator that has a stator with one single phase winding and a rotor with a plurality of symmetric phase windings. An induced voltage is generated in the single phase winding of the stator, and is directly delivered to an electrical load without going through any frequency conversion device. The off-grid power generating apparatus is a power generating system whose connection to an electrical power grid is temporarily or permanently unavailable. One single phase winding of the stator refers to that the coil of the stator has only one axial direction. The single phase winding of the stator may include a plurality of coils but the axial direction of the plurality of coils should coincide. Symmetric phase windings are windings configured to form a rotating magnetic field that is an air gap magnetic field of a motor with a constant magnitude. The plurality of symmetric phase windings may have two or more phases.

The power generating apparatus includes an engine, an alternator and an excitation control device in accordance with some embodiments. The alternator includes a rotor, a stator, one or more sensors and an electrical circuit. The rotor is coaxially coupled to the engine. The rotor includes a plurality of symmetric phase windings while the stator has a single phase winding configured to generate an induced voltage. The one or more sensors is configured to measure the operation data of the apparatus. The excitation control device is operatively connected with the engine and the alternator, and is configured to control the induced voltage generated in the single phase winding of the stator to make the induced voltage have a predetermined frequency by regulating the rotating magnetic field generated in the phase windings of the rotor. The excitation control device is also configured to calculate load power of the load in accordance with at least the operation data measured by the one or more sensors, and regulate speed of the engine responsive to the calculated load power. The electrical circuit connects the single phase winding of the stator and the load and is configured in a way that the induced voltage generated in the single phase winding and the output voltage applied to the load are at the same frequency.

In accordance with some embodiments, the single phase winding of the stator applies an excitation voltage to the plurality of symmetric phase windings of the rotor, and the alternator further includes a frequency conversion device. The frequency conversion device includes a direct current (DC) bus voltage regulator and an inverter. The DC bus voltage regulator is operatively connected with the single phase winding of the stator, and is configured to receive and rectify the excitation voltage from the single phase winding of the stator, and output a rectified DC bus voltage. The inverter is operatively connected with the DC bus voltage regulator, and is configured to receive the rectified DC voltage, and supply an alternating current voltage to the plurality of symmetric phase windings of the rotor. In accordance with some embodiments, the DC bus voltage regulator is an uncontrolled bridge rectifier or a power factor corrector.

In accordance with some embodiments, the apparatus further includes a DC power source and an inverter. The DC power source is operatively connected with the inverter. The inverter operatively receives the DC voltage and supplies an alternating current voltage to the plurality of symmetric phase windings of the rotor for establishing the rotating magnetic field.

In accordance with some embodiments, the one or more sensors further includes a voltage sensor, a current sensor and a speed sensor. The voltage sensor is configured to measure an amplitude of the output voltage applied to the electrical load. The current sensor is configured to measure an amplitude of an alternating current applied the electrical load. The speed sensor is configured to measure a rotation speed of the rotor. The excitation control device includes a first calculating element, a first modulating element, a second calculating element, a third calculating element and a second modulating element. The first calculating element is configured to determine a desired rotation speed of the engine in accordance with at least the amplitude of the output voltage measured by the voltage sensor and the amplitude of the alternating current measured by the current sensor. The first modulating element is configured to modulate the speed of the engine in accordance with the desired rotation speed of the engine. The second calculating element is configured to determine a slip angle in accordance with at least the rotation speed of the rotor measured by the speed sensor. The third calculating element is configured to determine a target voltage of the rotor in accordance with at least the amplitude of the output voltage measured by the voltage sensor. The second modulating element is configured to receive the slip angle and the target voltage of the rotor, generate a modulating signal in accordance with at least the target voltage of the rotor and the slip angle, and modulate the excitation current with the modulating signal. In accordance with some embodiments, the first modulating element is configured to modulate the speed of the engine with a closed control loop. In accordance with some embodiments, the third calculating element is configured to determine the target voltage of the rotor with a closed control loop. In accordance with some embodiments, the second modulating element is configured to generate the modulating signal in the form of a pulse signal, and the pulse signal is used to control switching time of a switch of the inverter.

In accordance with some embodiments, the apparatus is set to operate at a speed equal to or less than a synchronous speed of the alternator. The synchronous speed of the alternator refers to the rotation rate of the stator's magnetic field.

A portable generator set for powering an electrical load is provided in accordance with some embodiments. The generator set includes an engine, an induction alternator and an excitation control device. The induction alternator includes a rotor coaxially coupled to the engine, a stator and one or more sensors. The rotor includes a plurality of symmetric phase windings and the stator has a single phase winding configured to generate an induced voltage. The one or more sensors is configured to measure the operation data of the apparatus. The excitation control device is operatively connected with the engine and the alternator and is configured to control the induced voltage generated in the single phase winding of the stator by regulating the rotating magnetic field to make the induced voltage have a predetermined frequency. The excitation control device is also configured to calculate load power of the load in accordance with at least the operation data measured by the one or more sensors, and regulate speed of the engine in response to the calculated load power. The single phase winding of the stator is connected with the electrical load via a circuit configured in a way that the induced voltage generated in the single phase winding and the output voltage applied to the load are at the same frequency.

The power generating apparatus and the portable generator set (the portable generator set will not be mentioned below for the sake of briefness) deliver electrical power directly to an electrical load from the stator side without a frequency conversion device such as a converter and in inverter in the stator circuit. This means that load power, which constitutes a majority of the overall power (full power) generated by the power generating apparatus, is not regulated with a power converter. Rather, a power converter is provided on the rotor side for regulating an excitation power, which constitutes merely a small fraction of the overall power generated by the apparatus. As a result, a power converter with a comparatively low rated power can be used in the apparatus. The rated power of a power converter disposed on the rotor side of a power generating apparatus is merely around 10% of the rated output power of the power generating apparatus. If a power converter, usually in the form of an AC-DC-AC converter, were disposed on the stator side, then the rated power of the power converter would be equal to the overall power generated by the apparatus. Thus, the cost of the apparatus, particularly the inverter disposed on the rotor side with a low rated power, is comparatively low.

DETAILED DESCRIPTION

References are made to the accompanying drawings that form a part hereof, and in which is shown by way of illustration of the embodiments in which the embodiments may be practiced. Similar reference numbers indicate similar parts in all diagrams.

Figure 1A:
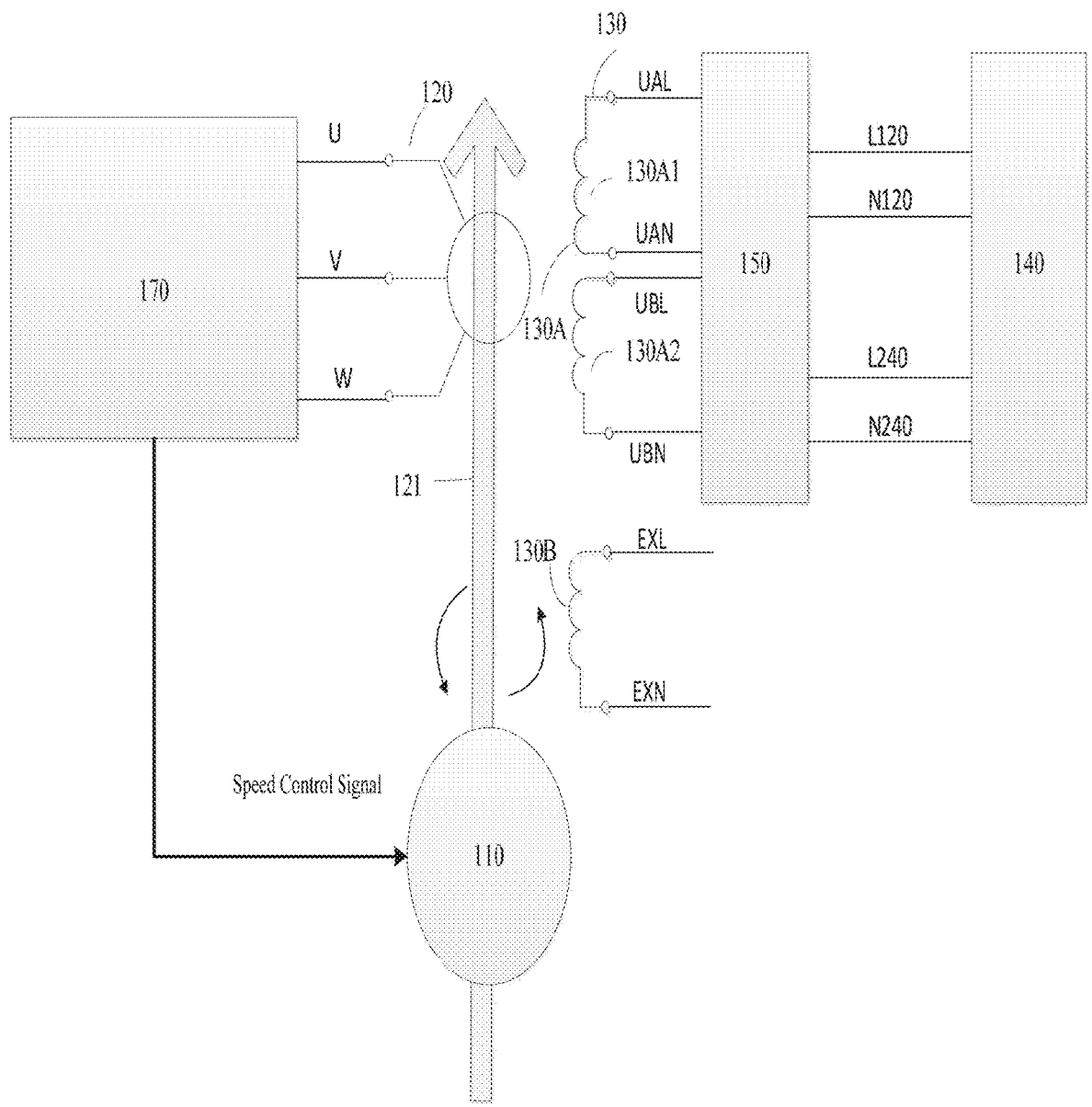
FIG. 1A is a schematic diagram of an off-grid power generating apparatus for powering an electrical load in accordance with some embodiments.

FIG. 1A is a schematic diagram of an off-grid power generating apparatus for powering an electrical load in accordance with some embodiments. An electrical load 140 may be an electrical appliance, e.g., an oven or an audio player that people use while doing camping and electrical appliances used during blackout. The off-grid apparatus includes an engine 110, an alternator and excitation control device 170. The engine 110 may receive fuel such as gasoline, diesel, natural gas, or liquid propane vapor through an intake. The fuel provided to the engine 110 is compressed and ignited to generate reciprocating motion of pistons of the engine 110. The reciprocating motion of the pistons of the engine 110 is converted to rotary motion by a crankshaft of the engine 110, which is operatively coupled to the alternator. The alternator may be an induction alternator with a variable speed and constant frequency. Specifically the alternator includes a rotor 120, a stator 130, one or more sensors (not shown in FIG. A) and an electrical circuit. The rotor 120 may be a cylindrical rotor having a plurality of symmetric phase windings. It is received within the stator 130 and coaxially coupled with the crankshaft of the engine 110 through a common shaft 121. As the engine 110 rotates, the common shaft 121 drives the rotor 120 to rotate and a rotating magnetic field is established in the symmetric phase windings of the rotor 120. The excitation control device 170 controls and monitors the alternator and the engine 110, which will be described with more details below.

In accordance with some embodiments, the stator 130 of the alternator includes a single phase winding in which a single phase voltage is induced responsive to the rotation of the magnetic field established in the plurality of symmetric phase windings of the rotor 120. The induced voltage is delivered directly as an output voltage to the electrical load 140 via power lines (e.g., L120, N120, L240 and N240 as illustrated in FIG. 1). The excitation control device 170 modulates the frequency of the induced voltage so that the frequency remains at a predetermined range, for example, 60 hertz (Hz) in North America and 50 Hz in China. Accordingly, the induced voltage is applicable to most household electrical appliances and other electric equipment, which are designed with a fixed nominal frequency.

The electrical circuit connects the single phase winding of the stator and the electrical load 140. The electrical circuit may include switch 150 illustrated in FIG. 1A, a plug and two sockets for a user to manually switch between different output voltages, an auto transfer system for automatically switch between different output voltages, or a circuit breaker that breaks the circuit when it is overpowered, etc. However, the electrical circuit herein does not include a frequency conversion device such as a converter and an inverter that changes the frequency of the voltage. In other words, the electrical circuit is configured in a way that the induced voltage generated in the single phase winding and the output voltage applied to the load are at the same frequency.

Figure 2:
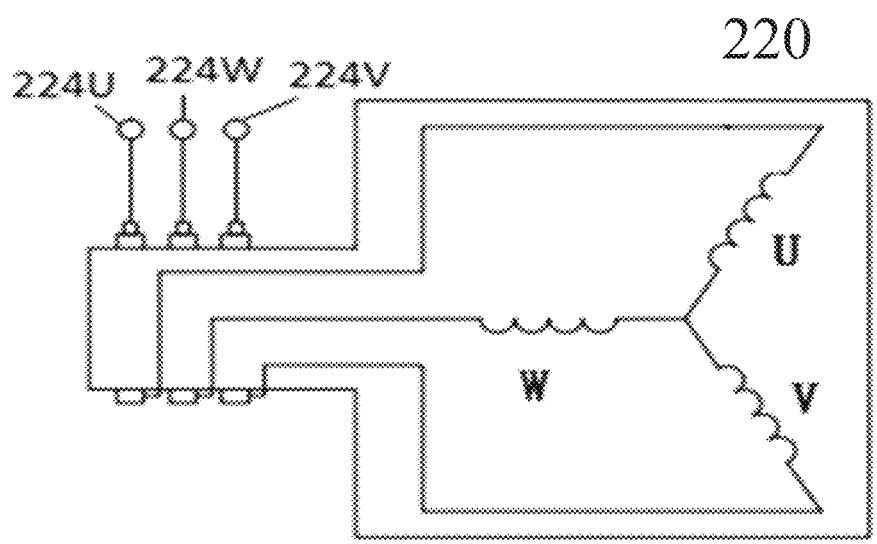
FIG. 2 illustrates an arrangement of the rotor in accordance with some embodiments.
Figure 3:
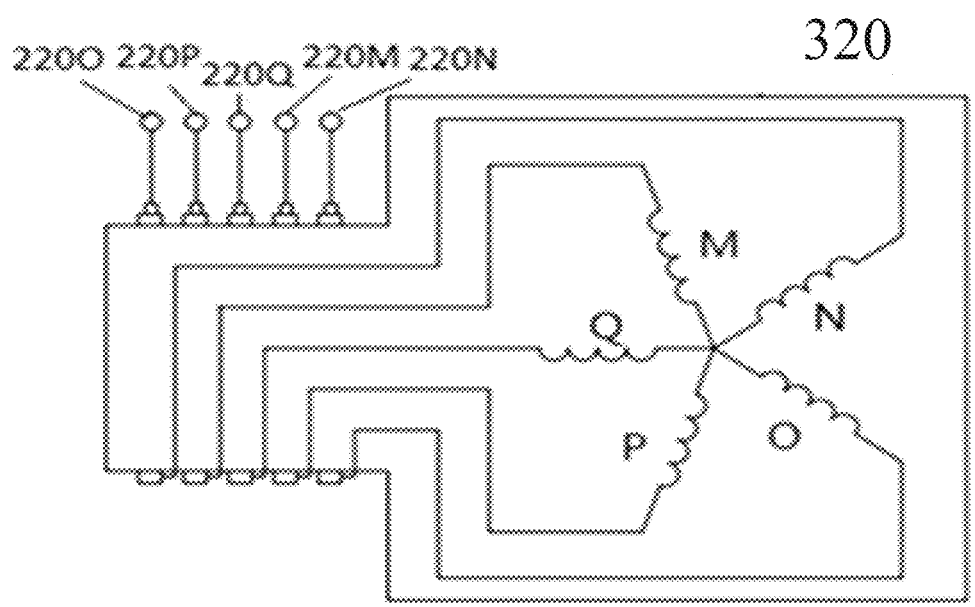
FIG. 3 illustrates an arrangement of the rotor in accordance with some embodiments.
Figure 4:
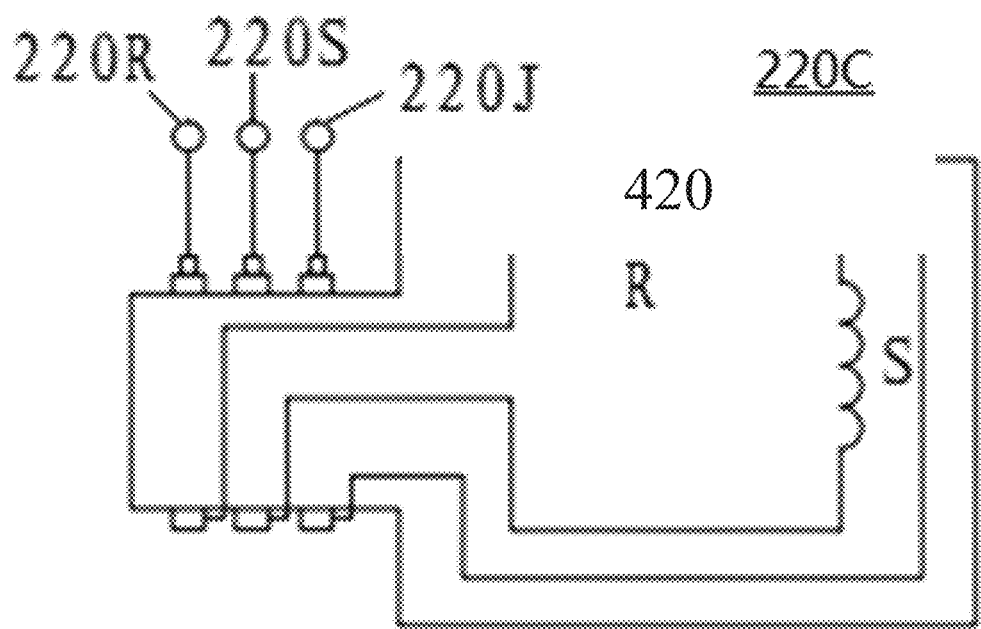
FIG. 4 illustrates an arrangement of the rotor in accordance with some embodiments.

In accordance with some embodiments, the rotor 120 may include a plurality of symmetric phase windings. FIG. 2 illustrates an arrangement of the rotor 220A in accordance with some embodiments. The rotor 220 has three phase windings U, V and W in a star connection. The axes of the three phase windings U, V and W are separate spatially at an angular degree of 120°. Each of the three phase windings U, V and W may include one coil with an equal number of coil turns. Terminal of the coils may be connected via binding posts 224U, 224V and 224W. Other symmetric configurations of three phase windings such as a delta connection are also applicable to the power generating apparatus. FIG. 3 illustrates another arrangement of the rotor in accordance with some embodiments. The rotor 320 includes five phase windings M, N, O, P and Q arranged in a symmetric manner, i.e., the axes of the five phase windings M, N, O, P and Q are separate spatially at an angular degree of 72°. Each of the five phase windings M, N, O, P and Q may include one coil with an equal number of coil turns. Terminal of the coils may be connected via binding posts 220O, 220P, 220Q, 220M and 220N. FIG. 4 illustrates another arrangement of the rotor 420 in accordance with some embodiments. Two symmetric phase windings R and S that are separate spatially at an angular degree of 90° are provided. Each of the two phase windings R and S may include one coil with an equal number of coil turns. Terminals of the coils may be connected via binding posts 220R, 220S and 220J.

In accordance with some embodiments, the single phase winding of the stator 130 may also provide an excitation voltage to the phase windings of the rotor 120 to energize the rotating magnetic field. The output voltage provided to the electric load from the stator side tends to vary when the engine speed changes. The output voltage is induced and affected by the magnetic field induced in the rotor windings. To prevent the output voltage from changing, the current in the phase windings of the rotor is regulated to offset the variation tendency of the induced voltage. In this manner, the amplitude and the frequency of the output voltage output from the stator 130 are kept stable.

The single phase winding of the stator 130 may include an output portion 130A and an excitation portion 130B in accordance with some embodiments. The output portion 130A and the excitation portion 130B include at least one coil respectively. In accordance with some embodiments, the output portion 130A and the excitation portion 130B provide the output voltage to the load and the excitation voltage to the rotor windings respectively.

The output portion 130A may include more than one coil to provide an output voltage of dual level in accordance with some embodiments. The output portion 130A includes a first segment 130A1 and a second segment 130A2. The first segment 130A1 includes one coil with a first terminal line UAL, which may be a live line, and a second terminal line UAN, which may be a neutral line. The second segment 130A2 may include another coil with a third terminal line UBL and a fourth terminal line UBN, which are a live line and a neutral line respectively. The first segment 130A1 and the second segment 130A2 may separately include a plurality of coils in series in accordance with some embodiments.

Figure 1B:
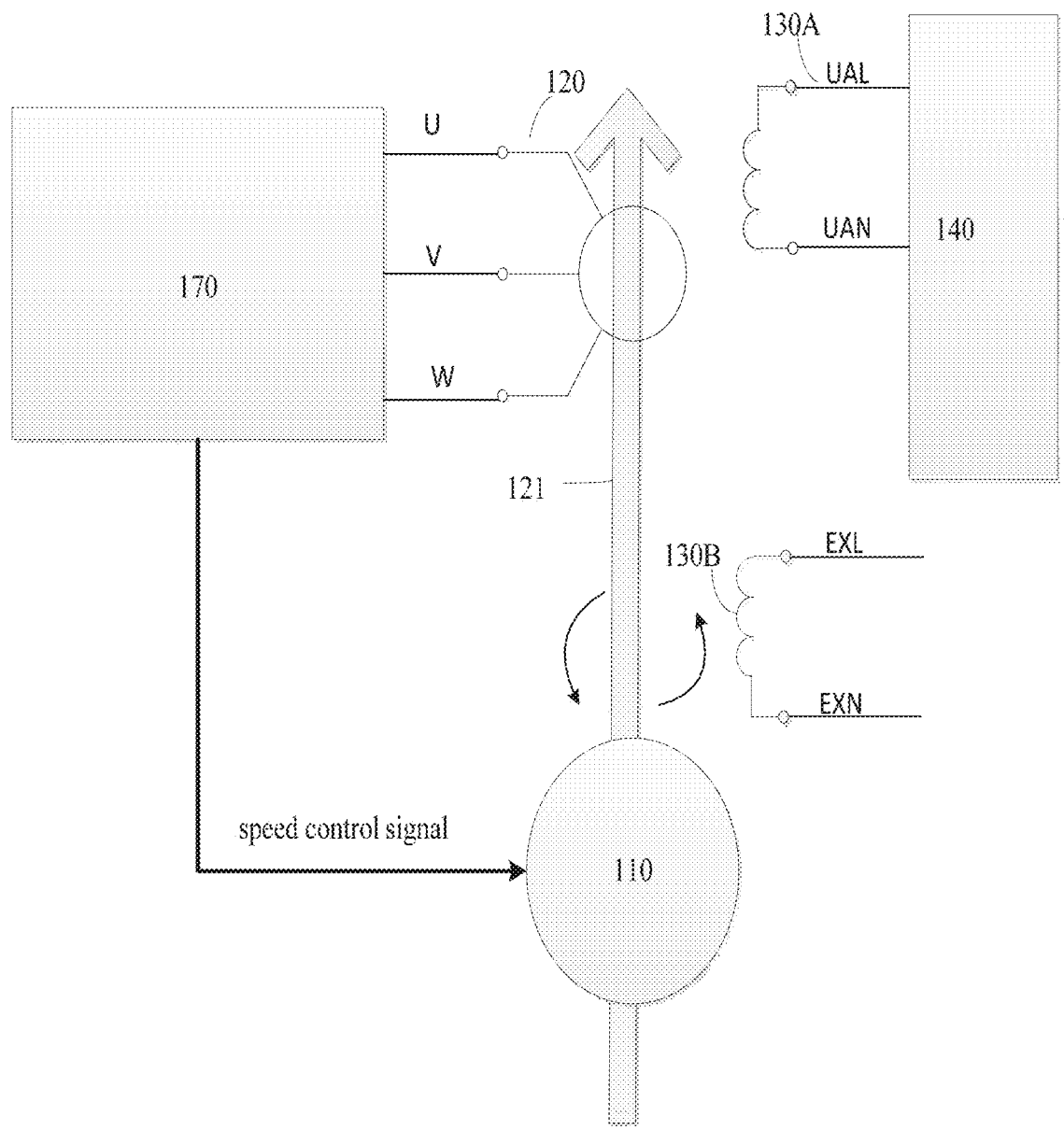
FIG. 1B is a schematic diagram of an off-grid power generating apparatus for powering an electrical load in accordance with some embodiments.

FIG. 1B is a schematic diagram of an off-grid power generating apparatus for powering an electrical load in accordance with some embodiments. The output portion 130A of the single phase winding of this apparatus has only one coil in which an output voltage of one level, for example 120 volts or 240 volts, is generated. The output voltage is directly imposed on the load 140 via the electrical circuit described above (in FIG. 1B the electrical circuit is the live line UAL and neutral line UAN).

The electrical circuit may include a switch 150, which may be a manually operated changeover switch or similar switches. The terminal lines UAL, UAN, UBL and UBN of the first segment 130A1 and the second segment 130A2 are separately connected to the switch 150 in accordance with some embodiments. A user may switch over the switch 150 to selectively connect the first segment 130A1 and the second segment 130A2 in parallel or in series. In this manner, an output voltage at dual levels, a low voltage (for example, 120 volts) and a high voltage (for example, 240 volts), may be generated and delivered from the output portion 130A to the load through the switch 150. Optionally, a plug connected with the electric load and two sockets connected with the first segment 130A1 and the second segment 130A2 may be used by a user to switch between the low voltage and the high voltage. For example, the user may put the plug in one socket through which the first segment 130A1 and the second segment 130A2 are in series connection to provide the electric load with the high voltage. The user may put the plug in the other socket through which the first segment 130A1 and the second segment 130A2 are in parallel connection (or either of the two segments connected) to provide the electric load with the low voltage. In some embodiments, the switch 150 (including any sensor associated with the switch 150) may send a signal to the excitation control device, indicating whether the one or both of the segments are connected or whether the connection is in parallel or in series.

The excitation portion 130B may include one coil that has terminal lines connected to the phase windings of the rotor U, V and W to apply the induced voltage generated in the excitation portion 130B to the phase windings for energizing the rotating magnetic field. The excitation portion 130B is independent of the output portion 130A. Therefore, the excitation portion 130B can provide an excitation voltage greater than the output voltage in a simple manner. For example, an excitation voltage of 320 volts (higher than a normal 220 volts) can be provided when the excitation portion 130B has a sufficient number of winding turns.

The stator 130 may have only one coil in accordance with some embodiments. This stator operates in a way similar to the way when the output portion 130A and the excitation portion 130B illustrated in FIG. 1A are permanently connected together. Hence, those skilled in the art would understand how the stator operates with the description above.

Figure 5:
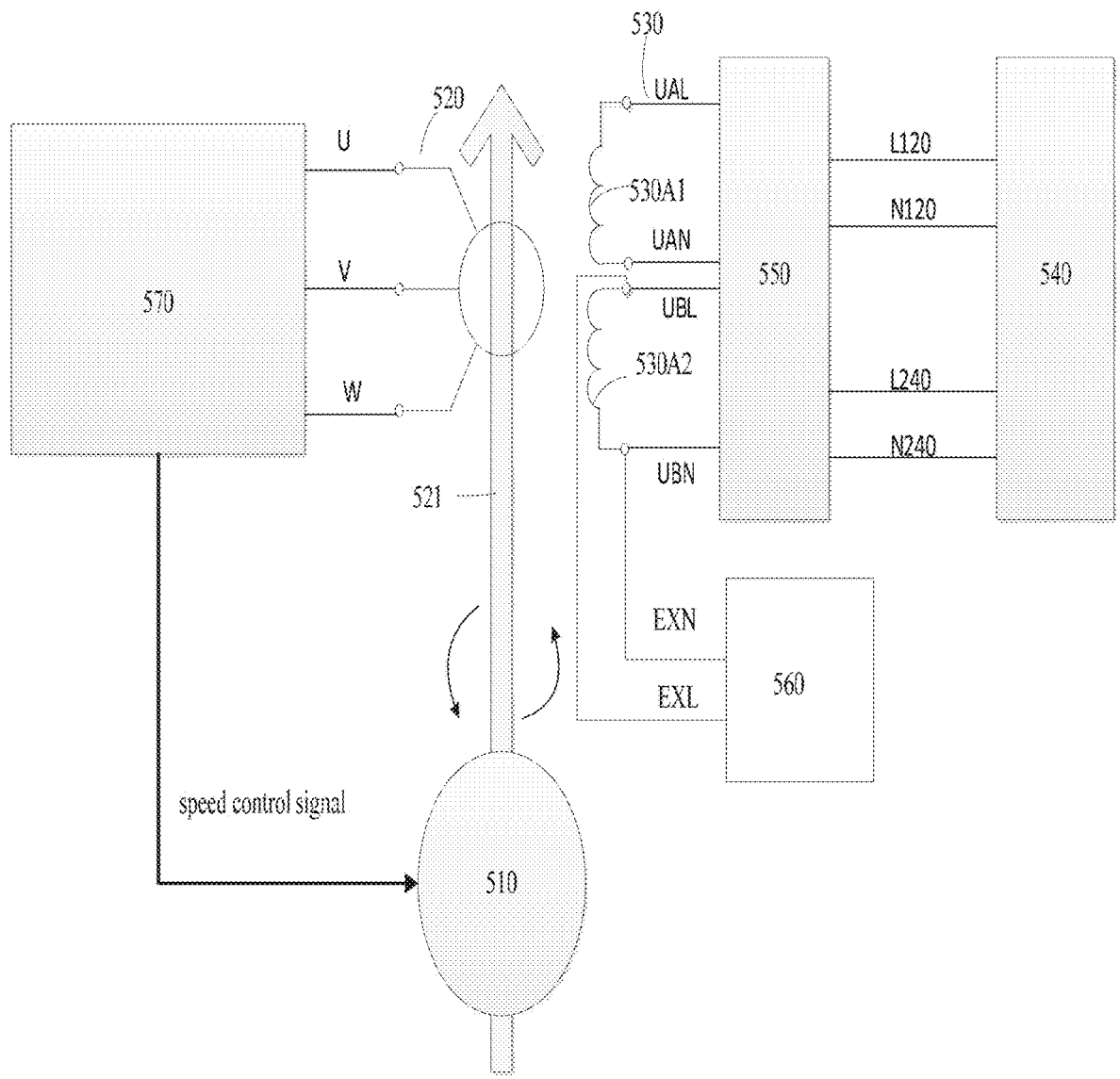
FIG. 5 is a schematic diagram of an off-grid power generating apparatus for powering an electrical load in accordance with some embodiments.

FIG. 5 is a schematic diagram of an off-grid power generating apparatus for powering an electrical load in accordance with some embodiments. Similar reference numbers are used in FIGS. 1A, 1B and 5 to indicate similar structural parts. For example, the reference number of 170 in FIGS. 1A and 1B and the reference number of 570 in FIG. 5 both refer to the excitation control device for controlling and monitoring the alternator and the engine. The single phase winding of the stator 530 may include a first portion 530A1 and a second portion 530A2 in accordance with some embodiments. The first portion 530A1 may include one coil with terminal lines UAL and UAN, and the second portion 530A2 may include another coil with terminal lines UBL and UBN. The terminal lines UAL, UAN, UBL and UBN are separately connected to the switch 550. A user may switch over the switch 550 to selectively connect the first portion 530A1 and the second portion 530A2 in parallel or in series to obtain an output voltage of 120 volts or 240 volts. Unlike the apparatuses illustrated in FIGS. 1A and 1B that have separate excitation portions, the first portion 530A1 or the second portion 530A2 is also used to provide the excitation voltage. For example, as illustrated in FIG. 5, the second portion 530A2 has an extra pair of terminal lines EXN and EXL that are connected to the phase windings of the rotor (not illustrated in FIG. 5). The second portion 530A2 may include more than one coil in series connection in some embodiments (not illustrated in FIG. 5), for example, a first coil and a second coil in series. The live line and neutral line of the first coil are connected to the switch to provide the output voltage, and the live lines of the first coil and the second coil are connected to the rotor circuit, i.e., the series voltage generated by the first coil and the second coil works as the excitation voltage. Compared with a stator with separate excitation coil, the coil number of the excitation coil in this stator is reduced.

Figure 6A:
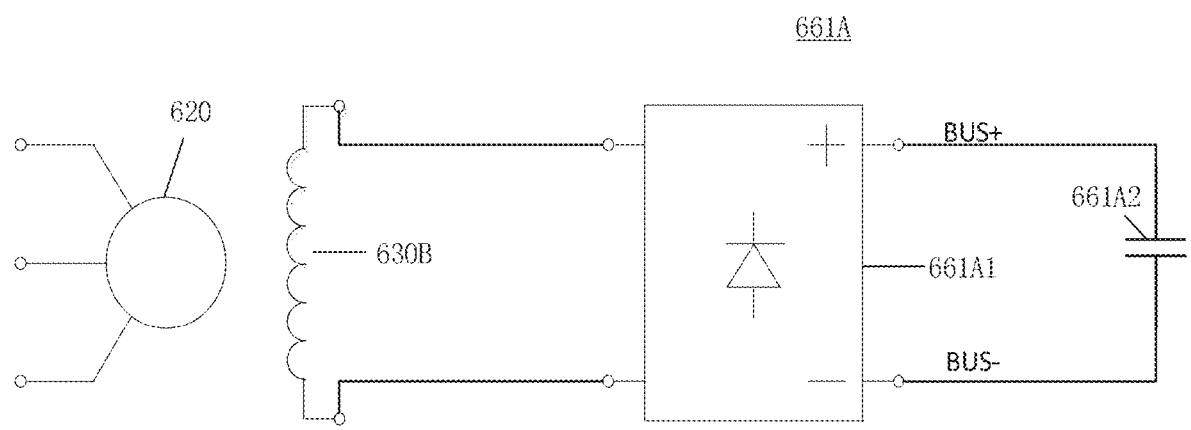
FIG. 6A illustrates a DC bus voltage regulator in accordance with some embodiments.
Figure 6B:
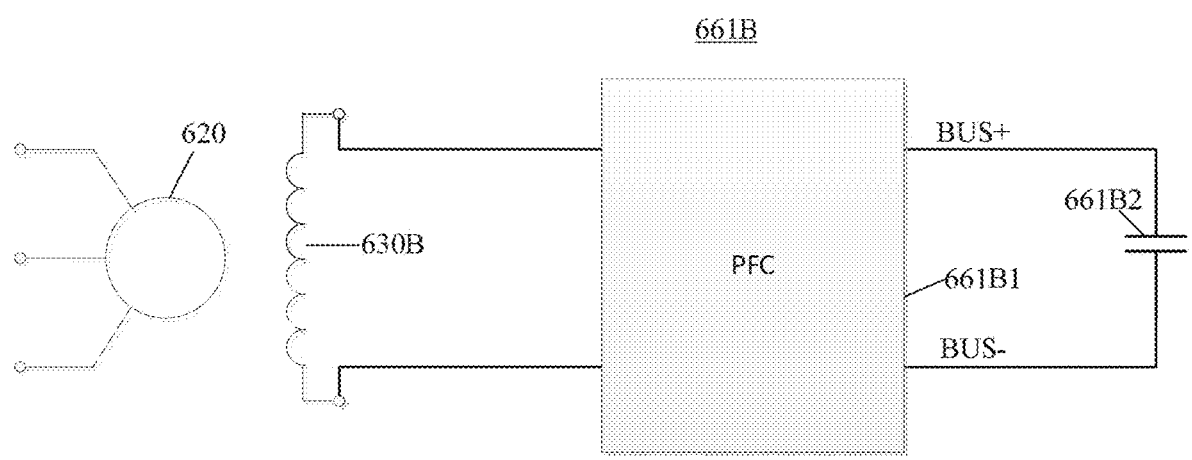
FIG. 6B illustrates another DC bus voltage regulator in accordance with some embodiments.

A frequency conversion device 560 may be provided between the second portion 530A2 and the phase windings of the rotor in accordance with some embodiments. The frequency conversion device 560, which is the so-called converter, regulates the induced voltage generated in the excitation portion 530A2 to generate a voltage with a desired frequency and amplitude to provide to the phase windings of the rotor for energizing the rotating magnetic field. The frequency conversion device 560 may include a DC bus voltage regulator that receives the excitation voltage from the single phase winding of the stator and outputs a DC voltage to buses BUS+, BUS−. FIG. 6A illustrates a DC bus voltage regulator 661A in accordance with some embodiments. The DC bus voltage regulator 661A includes an uncontrolled Bridge Rectifier 661A that may have four individual rectifying diodes 661A1 connected in "bridge" configuration to receive the excitation voltage from the excitation portion 630B or one of the two portions of the single phase winding and generate the desired DC voltage. The main advantage of this bridge rectifier is that it does not require a special center tapped transformer, thereby reducing its size and cost. A bus capacitor 661A2 may be provided for smoothing the output of the uncontrolled Bridge Rectifier 661A to produce a DC voltage. FIG. 6B illustrates another DC bus voltage regulator 661B in accordance with other embodiments. A Power factor correction device 661B1 is used to rectify and boost the excitation voltage received from the single phase winding of the stator. A bus capacitor 661B2 may be provided to store energy and filter out high frequency voltage components.

Figure 7:
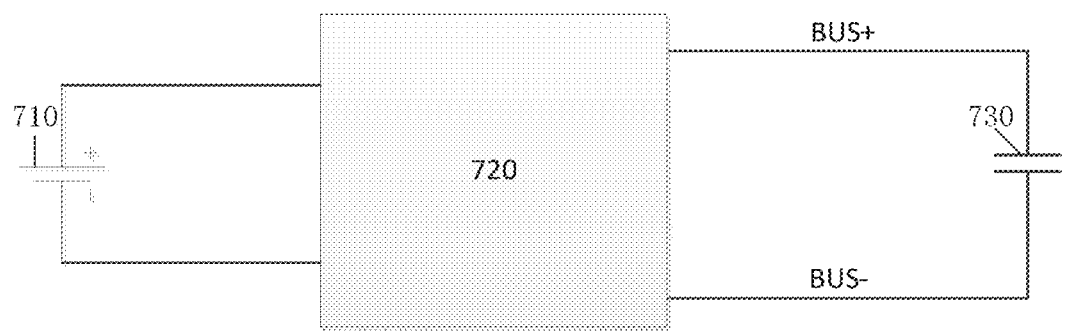
FIG. 7 illustrates another embodiment of providing an excitation voltage to the phase windings of the rotor in accordance with some embodiments.

FIG. 7 illustrates another embodiment of providing an excitation voltage to the phase windings of the rotor for establishing the rotating magnetic field. A DC power source, which may be a battery 710 for supplying a DC voltage. A DC-DC converter 720 is connected with the battery 710 to increase the amplitude of the DC voltage before the DC voltage is applied to the buses BUS+ and BUS− that is connected to the phase windings of the rotor for energizing the rotating magnetic field. A bus capacitor 730 may be provided to store energy and filter out high frequency voltage components.

Reference is now made back to FIGS. 1A, 1B and 5. The power generating apparatus may include the excitation control device 170 or 570 for controlling and monitoring the alternator and the engine 110 or 510. A microprocessor-based or otherwise computer-driven systems can work as the excitation control device. The excitation control device 170 or 570 has a processor and a memory. The processor operates under the direction of stored program instructions regarding the operation of the alternator. The excitation control device 170 or 570 is electrically connected with the engine and the alternator 110 or 510, for example, the control device 170 or 570 is physically attached to the alternator, and connected with the engine 110 or 510 via wires or a wireless mechanism. The excitation control device 170 or 570 collects operation data measured by the one or more sensors and regulates the amplitude and frequency of the excitation voltage. In some embodiments, operation data includes the voltage, current, frequency, speed or any data that may indicate the status of the apparatus and be collected by sensors as will be described blow with reference to FIGS. 8-10. The excitation control device 170 or 570 may also be connected with the engine 110 or 510 with the use of a wired connection or a wireless connection. The excitation control device 170 or 570 calculates real time load power with the measured real time operation data from the sensors, and regulates speed of the engine 110 or 510 in response to the calculated real time load power.

In accordance with some embodiments, while the excitation control device 170 or 570 directly controls the engine 110 or 510 in the embodiments described above, the engine 110 or 510 may also be directly controlled by an engine control module (ECM) not shown in the figures, which may be physically attached to the engine 110 or 510. The ECM controls engine speed, and thereby control the output power of the alternator. The ECM may also monitors a variety of engine characteristics such as fuel consumption, engine start information and oil pressure. The excitation control device 170 or 570 may controls the ECM. Control signals from the excitation control device 170 or 570 can be transmitted to the ECM through a communication bus.

Figure 8:
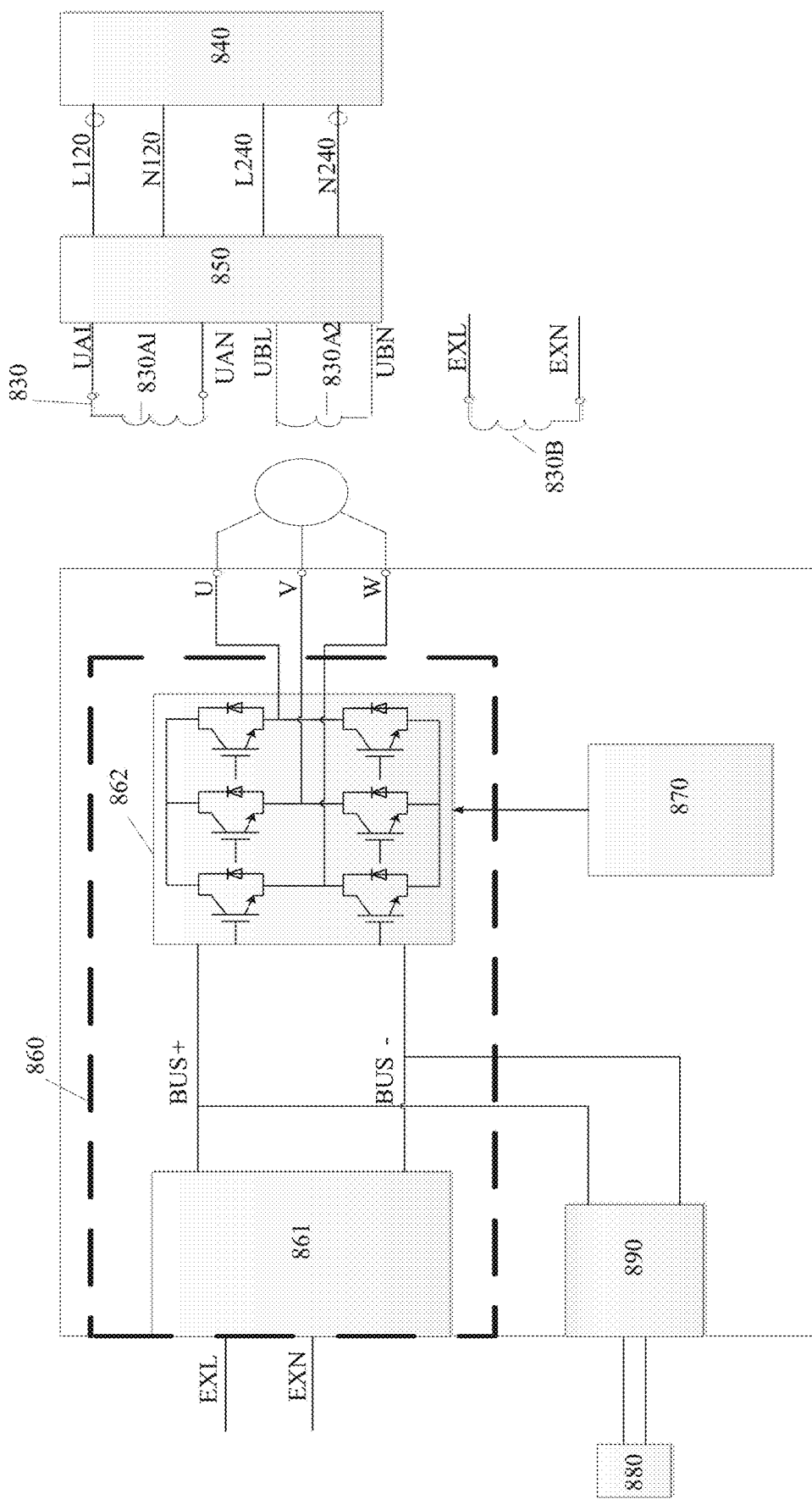
FIG. 8 is a schematic diagram of another off-grid power generating apparatus for powering an electrical load in accordance with some embodiments.

FIG. 8 is a schematic diagram of another power generating apparatus for powering an electrical load in accordance with some embodiments. This exemplary apparatus is similar to those described previously with reference to FIGS. 1A, 1B and 5, and therefore identical and similar parts will not be discussed again herein. The apparatus includes a frequency conversion device 860. The frequency conversion device 860 mainly includes a DC bus voltage regulator 861 and an inverter 862. The DC bus voltage regulator 861 is similar to those described above with reference to FIGS. 6A and 6B, and therefore the frequency conversion device will not be described again herein.

The inverter 862 can be two-phase, three-phase, four-phase or five-phase DC/AC inverters corresponding to the number of the symmetric phase windings of the rotor. In FIG. 8, the inverter 862 is illustrated as a three-phase six-switch DC/AC inverter that receives control pulse signals, for example, in the form of a PWM (pulse-width modulation) or SVPWM (Space Vector Pulse Width Modulation) waveform from the excitation control device 870. The control pulse signals are duty ratios of switching-on time in substance. The excitation control device 870 is programmed to provide the pulse signals that are PWM or SVPWM excitation signals with a desired amplitude and frequency. To keep the induced voltage constant, the pulse signals are employed to modulate the amplitude and frequency of the current flowing in the phase windings of the rotor, in order to change the magnetic field in a way that offsets the variation tendency of the induced voltage. The excitation control device 870 applies the excitation signals to the rotor windings to regulate the intensity of the rotating magnetic field generated in the rotor windings and the rotating speed of the rotating magnetic field relative to the rotor. As a result, the amplitude of the output voltage of the stator, i.e., the output voltage of the apparatus, is kept stable and the frequency of the output voltage is maintained constant. The PWM/SVPWM waveform can be a square wave, modified sine wave and sine wave depending on the circuit design of the inverter 862. Each leg of the inverter 862 may be connected with one phase winding of the rotor through wires. The inverter 862 has one or more switching elements on each leg. The switching elements can be semiconductor switching elements such as IGBT, BJT, MOSFET, GTO, SCR and IGCT. A pair of IGBTs is provided on each leg of the inverter 862 in accordance with some embodiments as illustrated in FIG. 8. The pulse signals from the excitation control device 870 successively control the switch ON and OFF time of the switching elements of the inverter 862 with duty ratios. A relatively stable DC voltage from the DC bus voltage regulator 861 is applied to the inverter 862 as illustrated in FIG. 8. The required input DC voltage of the inverter 862 depends on the design and function of the inverter 862. Factors that can be considered include the amplitude of the induced voltage, the rotating speed range of the engine, the structure of the rotor windings, the current and voltage parameters of IGBT used, etc. The inverter 862 generates PWM or SVPWM excitation signals with desired frequency and amplitude, and the excitation signals are employed to modulate the amplitude and frequency of the current flowing in the phase windings of the rotor so that a rotating magnetic field with the desired intensity and rotating speed relative to the rotor is established. The rated power of the inverter 862 used in the apparatus with a rated power of 7,000 watts is less than 1,500 watts, usually is 700-800 watts. The rated power of an inverter in a power generator with a rated power of 7,000 watts in which an inverter is used to regulate the overall power generated by the generator is usually 7000 watts. Thus, inverters with a much smaller capacity can be used in the apparatus in the embodiments, since the inverter 862 only regulates a fraction of the overall power that is supplied to the rotor for regulating the amplitude and frequency of the output voltage of the apparatus output from the stator side. Accordingly, the inverter 862 is lighter and more cost-efficient. It is estimated that the cost of the inverter accounts for 20% to 60% of the cost of a traditional power generator. Therefore, the power generating apparatus in the embodiments described above enjoys a superb advantage in terms of cost.

The excitation control device 870 is programmed to regulate the power of the engine, i.e., the speed of the engine. The excitation control device 870 calculates real time load power with the measured operation data from the sensors that are not illustrated in FIG. 8, and regulates speed of the engine in response to the calculated real time load power. The power of the engine is regulated to follow a pre-defined engine power-speed characteristic of the engine to track the maximum power point. The pre-defined engine power-speed characteristic of the engine can be stored in the excitation control device 870.

The alternator may also include a battery 880 in accordance with some embodiments. The battery 880 may be electrically separate from the buses BUS+, BUS− for the sake of safety. The DC voltage of the battery 880 may be applied to the buses BUS+, BUS− through an excitation voltage provider 890 for providing an excitation voltage for establishing a rotating magnetic field in the rotor windings when the power generating apparatus starts. The excitation voltage provider 890 may be structured in the form of a transformer. The amplitude of the excitation voltage may be quite small, for example from 1 volts to 20 volts.

The apparatus is set to operate at a rotation speed equal to or less than the synchronous speed of the alternator in accordance with some embodiments. The synchronous speed of the alternator refers to the rotation rate of the stator's magnetic field. For example, when the synchronous speed of the alternator is 3600 rpm, an engine, for example a gasoline engine, is set to operate at a speed between 3000-3600 rpm in a stable working state. The faster the engine runs, the greater the output power of the engine is. The engine speed of a power generating apparatus will increase up to 3600 rpm as the apparatus picks up its power from an idling state when the apparatus starts to its rated power. When the rotating speed of the engine reaches 3600 rpm, the excitation voltage becomes a DC voltage in accordance with some embodiments.

Thus, in accordance with some embodiments, an apparatus will always operate in a sub-synchronous or synchronous state when the apparatus is set to operate at a rotation speed equal to or less than the synchronous speed of the alternator. This means that electrical energy in the apparatus always flows from the stator side to the rotor side. No energy flows in the opposite direction. This feature makes it possible to use low cost device or parts with a uni-directional characteristic such as the uncontrolled Bridge Rectifier illustrated in FIG. 6A in the apparatus. It should be appreciated that the apparatus may operate at a speed more than the reference speed in undesirable operation conditions. Protection mechanisms such as a circuit breaker may be provided in the apparatus to stop it from operation when the speed is excessive.

Figure 9:
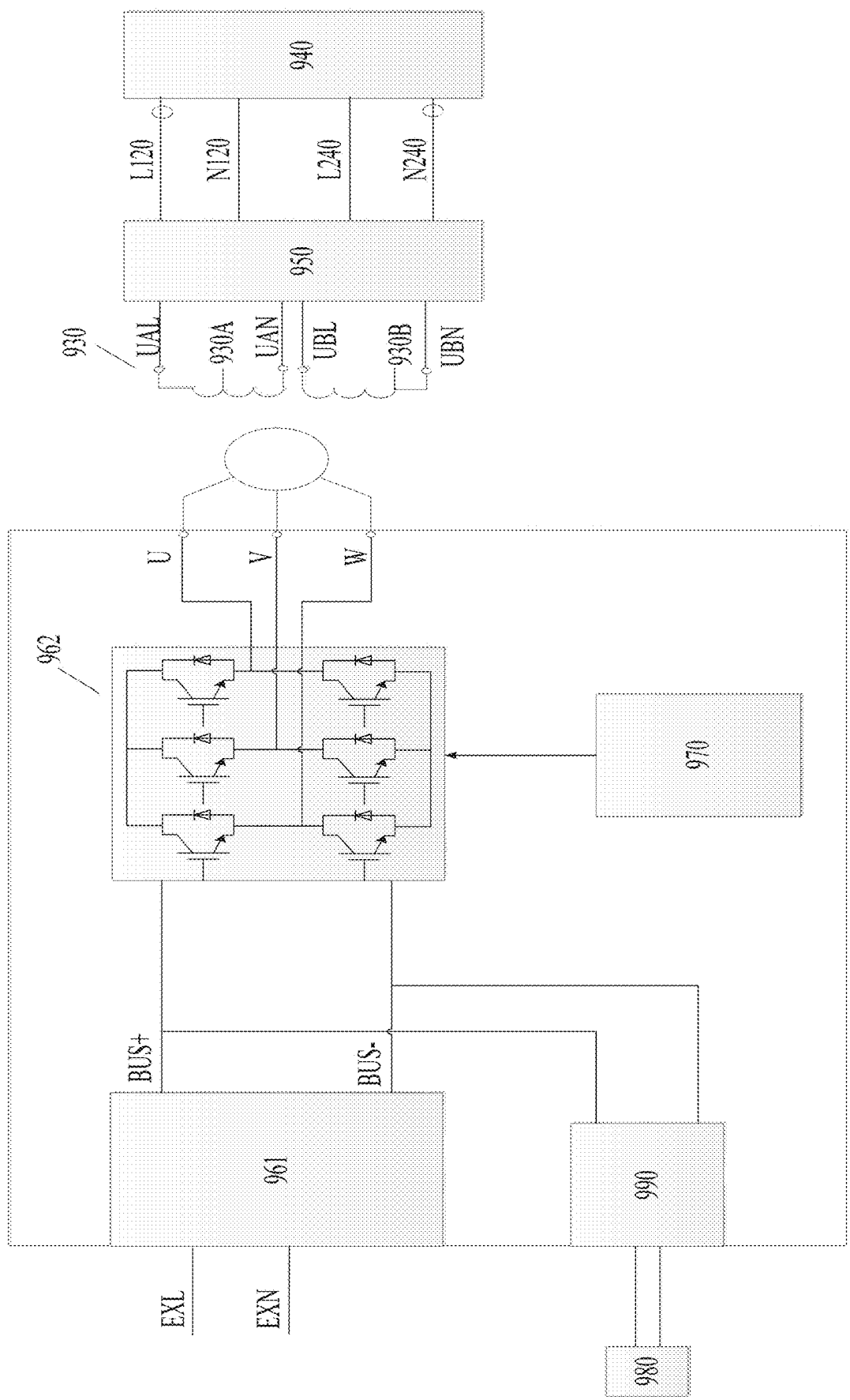
FIG. 9 is a schematic diagram of another off-grid power generating apparatus for powering an electrical load in accordance with some embodiments.

FIG. 9 is a schematic diagram of another power generating apparatus for powering an electrical load in accordance with some embodiments. The inverter 962 can be two-phase, three-phase, four-phase or five-phase DC/AC inverters corresponding to the number of the symmetric phase windings of the rotor. In FIG. 9, the inverter 962 is illustrated as a three-phase six-switch DC/AC inverter that receives control pulse signals, for example, in the form of a PWM (pulse-width modulation) (or SVPWM, Space Vector Pulse Width Modulation) waveform from the excitation control device 970. The control pulse signals are duty ratios of switching-on time in substance. The excitation control device 970 is programmed to provide the pulse signals that are PWM (or SVPWM) excitation signals with a desired amplitude and frequency. To keep the induced voltage constant, the pulse signals are employed to modulate the amplitude and frequency of the current flowing in the phase windings of the rotor, in order to change the magnetic field in a way that offsets the variation tendency of the induced voltage. The excitation control device 970 applies the excitation signals to the rotor windings to regulate the intensity of the rotating magnetic field generated in the rotor windings and the rotating speed of the rotating magnetic field relative to the rotor. As a result, the amplitude of the output voltage of the stator, i.e., the output voltage of the apparatus, is kept stable and the frequency of the output voltage is maintained constant. The PWM (or SVPWM) waveform can be a square wave, modified sine wave and sine wave depending on the circuit design of the inverter 962. Each leg of the inverter 962 may be connected with one phase winding of the rotor through wires. The inverter 962 has one or more switching elements on each leg. The switching elements can be semiconductor switching elements such as IGBT, BJT, MOSFET, GTO, SCR and IGCT. A pair of IGBTs is provided on each leg of the inverter 962 in accordance with some embodiments as illustrated in FIG. 9. The pulse signals from the excitation control device 970 successively control the switch ON and OFF time of the switching elements of the inverter 962 with duty ratios. A relatively stable DC voltage from the DC bus voltage regulator 961 is applied to the inverter 962 as illustrated in FIG. 9. The required input DC voltage of the inverter 962 depends on the design and function of the inverter 962. Factors that can be considered include the amplitude of the induced voltage, the rotating speed range of the engine, the structure of the rotor windings, the current and voltage parameters of IGBT used, etc. The inverter 962 generates PWM (or SVPWM) excitation signals with desired frequency and amplitude, and the excitation signals are employed to modulate the amplitude and frequency of the current flowing in the phase windings of the rotor so that a rotating magnetic field with the desired intensity and rotating speed relative to the rotor is established. The rated power of the inverter 962 used in the apparatus with a rated power of 7,000 watts is less than 1,500 watts, usually is 700-800 watts. The rated power of an inverter in a power generator with a rated power of 7,000 watts in which an inverter is used to regulate the overall power generated by the generator is usually 7000 watts. Thus, inverters with a much smaller capacity can be used in the apparatus in the embodiments, since the inverter 962 only regulates a fraction of the overall power that is supplied to the rotor for regulating the amplitude and frequency of the output voltage of the apparatus output from the stator side. Accordingly, the inverter 962 is comparatively light and cost-efficient. It is estimated that the cost of the inverter accounts for 20% to 60% of the cost of a traditional power generator. Therefore, the power generating apparatus in the embodiments described above enjoys a superb advantage in terms of costs.

The excitation control device 970 is programmed to regulate the power of the engine, i.e., the speed of the engine. The excitation control device 970 calculates real time load power with the measured operation data from the sensors that are not illustrated in FIG. 9, and regulates speed of the engine in response to the calculated real time load power. The power of the engine is regulated to follow a pre-defined engine power-speed characteristic of the engine to track the maximum power point. The pre-defined engine power-speed characteristic of the engine can be stored in the excitation control device 970.

The alternator may also include a battery 980 in accordance with some embodiments. The battery 980 may be electrically separate from the buses BUS+, BUS− for the sake of safety. The DC voltage of the battery 980 may be applied to the buses BUS+, BUS− through an excitation voltage provider 990 for providing an excitation voltage for establishing a rotating magnetic field in the rotor windings when the power generating apparatus starts. The excitation voltage provider 990 may be structured in the form of a transformer. The amplitude of the excitation voltage may be quite small, for example from 1 volts to 20 volts.

The difference between FIG. 8 and FIG. 9 is that the apparatus in FIG. 9 does not have a separate excitation portion as the apparatus illustrated in FIG. 5. It is easy for those skilled in the art to understand the principle of the apparatus in FIG. 9 thus no more description will be repeated herein.

A portable generator set for powering an electrical load is provided in accordance with some embodiments. The generator set includes an engine, an induction alternator and an excitation control device. The induction alternator includes a rotor coaxially coupled to the engine, a stator and one or more sensors. The rotor includes a plurality of phase windings and the stator has a single phase winding configured to generate an induced voltage. The one or more sensors is configured to measure the operation data of the apparatus. The excitation control device is operatively connected with the engine and the alternator and is configured to control the induced voltage generated in the single phase winding of the stator by regulating the rotating magnetic field to make the induced voltage have a predetermined frequency. The excitation control device is also configured to calculate load power of the load in accordance with at least the operation data measured by the one or more sensors, and regulate speed of the engine responsive to the calculated load power. The single phase winding of the stator is connected with the electrical load via a circuit configured in a way that the induced voltage generated in the single phase winding and the output voltage applied to the load are at the same frequency.

The power generating apparatus for powering an electrical load is described with reference to FIGS. 1-9 above. The apparatus, as previously described, having a stator with a single phase winding and a rotor with a plurality of symmetric phase windings poses a challenge to conventional control strategies for generators. It is difficult to control an apparatus having a stator with a single phase winding in which an output voltage is generated without frequency conversion. A simple and cost-effective control system for the apparatus is provided in this disclosure, which will be described with reference to FIGS. 10-18.

In accordance with some embodiments, in the control system, an excitation signal is employed to modulate the frequency and amplitude of the current flowing in the rotor windings. Thereby the intensity of the rotating magnetic field and its rotating speed relative to the rotor are controlled. In this manner, the amplitude of the output voltage is kept stable and the frequency of the output voltage is maintained constant. Meanwhile, the rotating speed of the engine is variable as the electrical load changes so that fuel efficiency is optimized. This control system enables the power generating apparatus to change its engine speed in a wide range as the electrical load it drives changes.

Figure 10A:
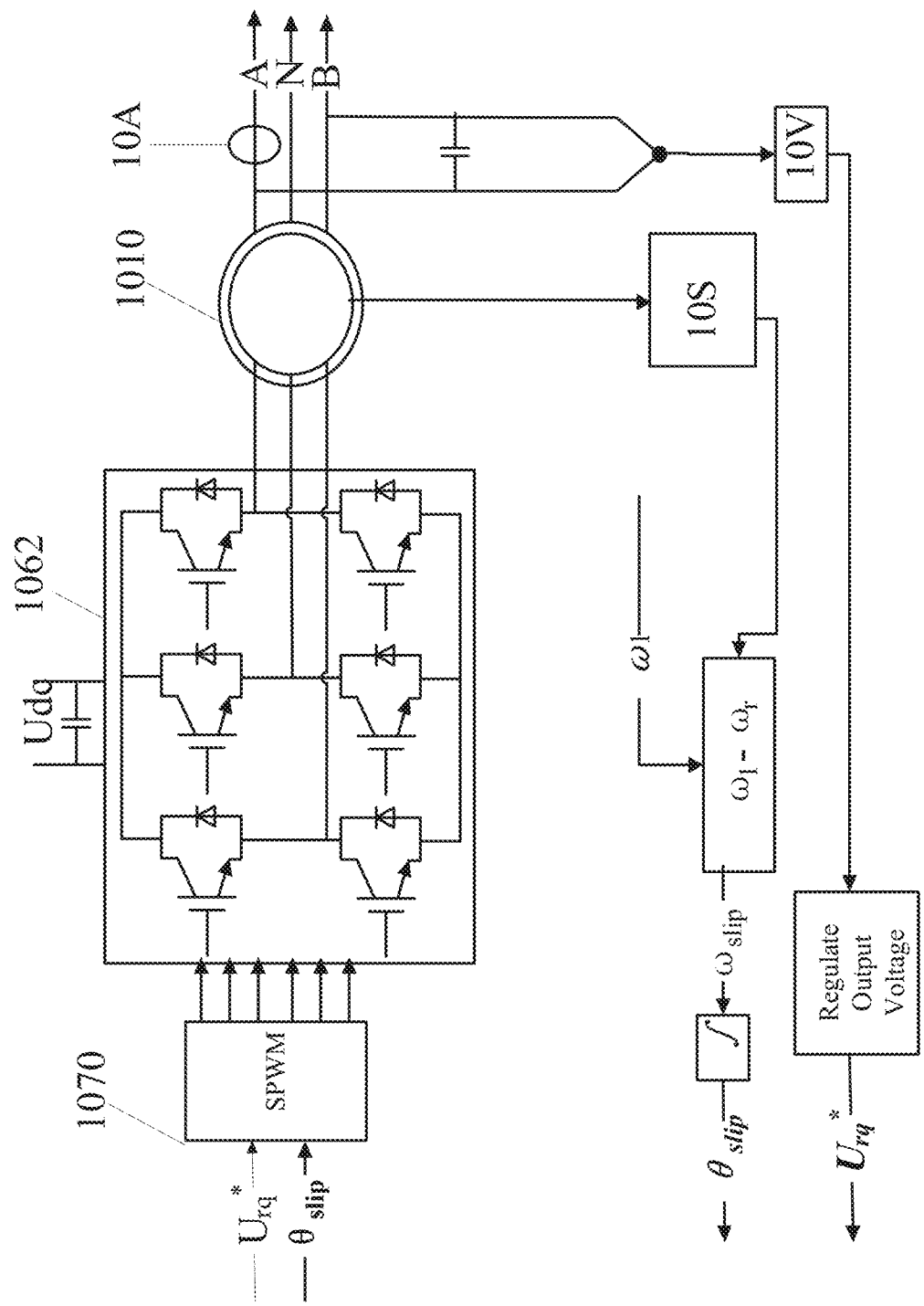
FIG. 10A illustrates a control system for implementing a control strategy in accordance with some embodiments.
Figure 10B:
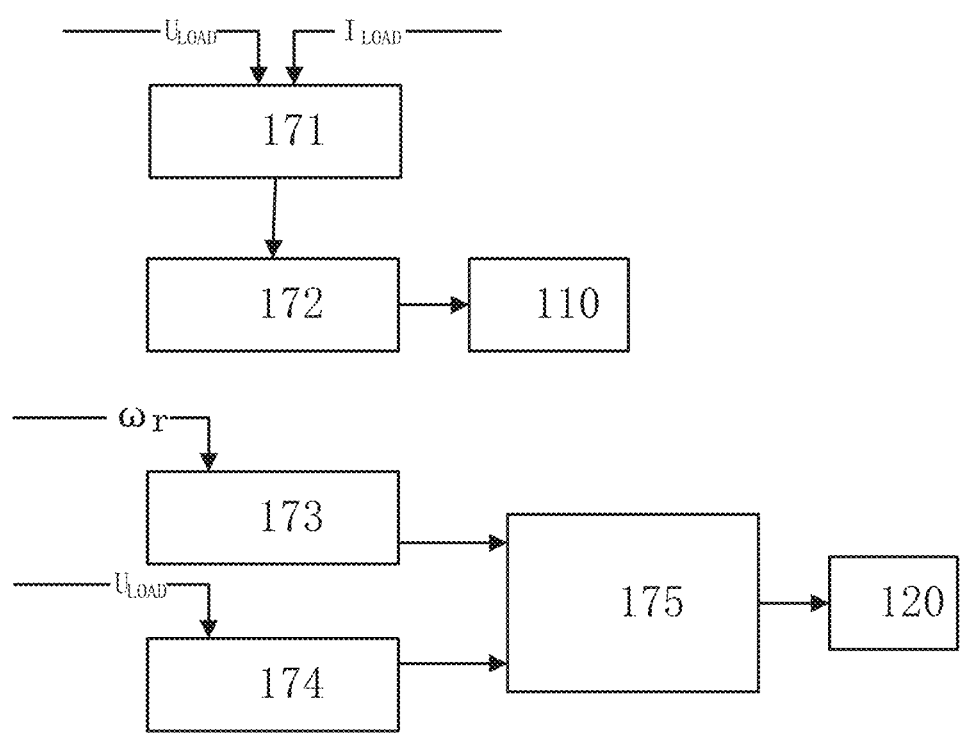
FIG. 10B is a schematic diagram of an excitation control device in accordance with some embodiments.
Figure 11:
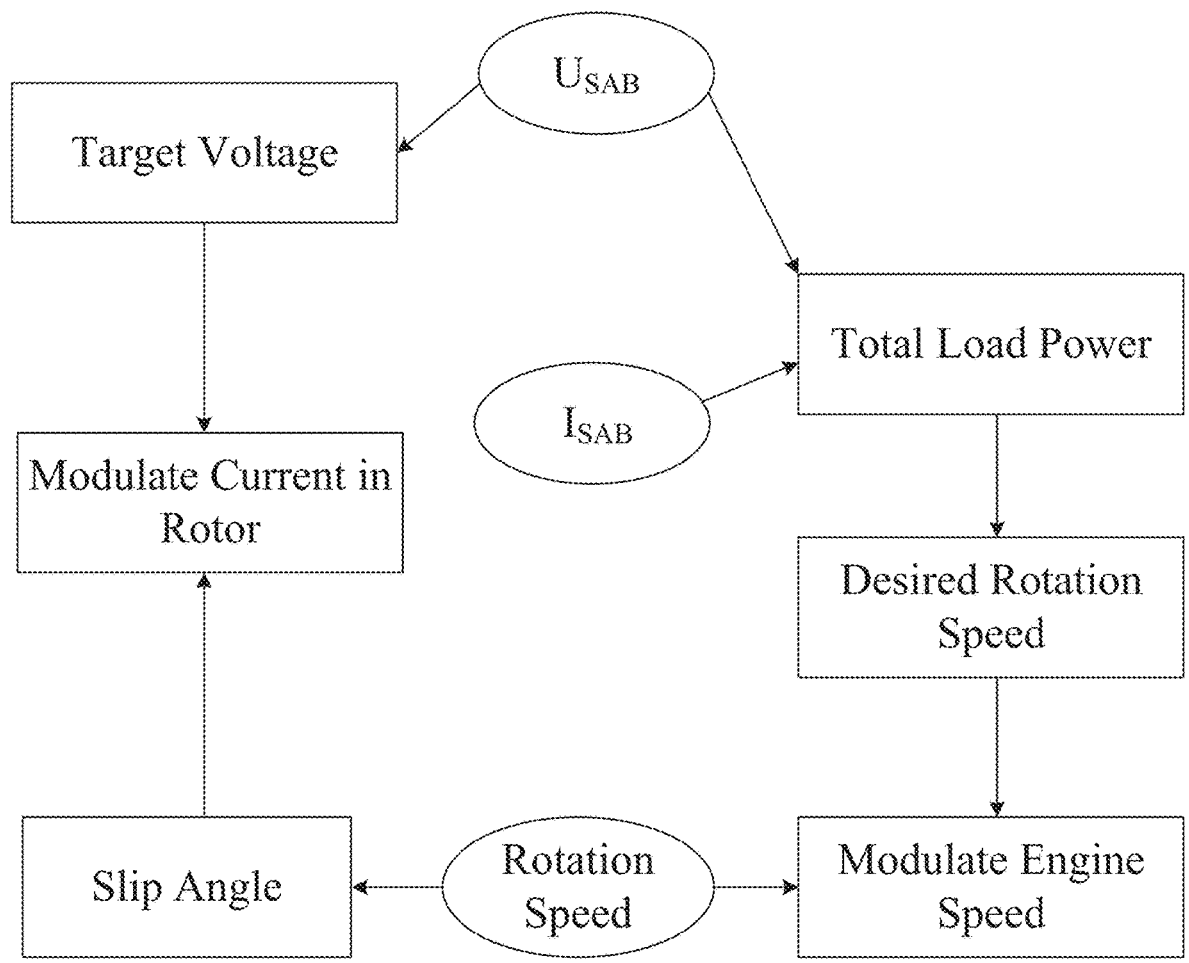
FIG. 11 is a flowchart of a control strategy corresponding to the control system illustrated in FIG. 10A.

FIG. 10A illustrates a control system for implementing a control strategy in accordance with some embodiments. FIG. 10B is a schematic diagram of an excitation control device in accordance with some embodiments. FIG. 11 is a flowchart of a control strategy corresponding to the control system illustrated in FIG. 10A. The single phase winding of the stator in these embodiments generates an output voltage of one level. The one leveled output voltage may be live to live high voltage of 240 volt $U_{SAB}$ which is provided to the electrical load through live terminal lines A and B to the load (as illustrated in FIG. 10A). Another example of the one leveled output voltage is live to neutral 120 volt low voltage which is provided to the electrical load through live terminal line A and neutral terminal line N to the load (not illustrated in FIG. 10A). In accordance with some embodiments, the level of the output voltage can be changed by regulating the intensity of the rotating magnetic field. For instance, a low output voltage of 120 volts can be boosted to a high output voltage of 240 volts by increasing the intensity of the rotating magnetic field. It should be understood that the control system illustrated in FIG. 10A and the control strategy illustrated in FIG. 11 are applicable to an apparatus that generates an output voltage of 120 volts from the stator side.

The rotor has three windings U, V, W in a symmetric configuration that are connected with three legs of an inverter 1062 separately. A DC voltage $U_{dc}$ from the DC bus voltage regulator (which is not illustrated FIG. 10A) is applied to the inverter 1062 as previously described. A voltage sensor 10V and a current sensor 10A are electrically connected with the terminal lines A, B for measuring the output voltage $U_{SAB}$ and the load current $I_{SAB}$ output by the single phase winding of the stator. Specifically, the amplitude of the output voltage $U_{SAB}$ and the load current $I_{SAB}$ are measured. A speed sensor 10S is connected with the rotor to measure the rotating speed of the rotor. The speed sensor 10S can measure the rotating speed of the engine, instead of the rotor, since the rotor and the engine are coaxially connected. The amplitudes of the output voltage and the load current and the rotating speed can be real time values measured by the voltage sensor 10V, the current sensor 10A and the speed sensor 10S, for example, real time values measured every millisecond or every second. They can also be the averages or integrals of some real time values measured by the sensors in a period. For example, the sensors measure real time values every second, and the amplitudes of the output voltage and the load current and the rotating speed can be the averages or integrals of the measured real time values in every 10 successive seconds. The measured operation data of the apparatus from the current sensor 10A, voltage sensor 10V and speed sensor 10S can be modulated, filtered and then sent to the excitation control device 1070.

In accordance with some embodiments, the excitation control device 1070 can be programmed to have functional modules to implement the control strategy illustrated in FIG. 11.

FIG. 10B is a schematic diagram of an excitation control device in accordance with some embodiments. The excitation control device may include a first calculating element 171, a first modulating element 172, a second calculating element 173, a third calculating element 174 and a second modulating element 175. The first calculating element 171 determines a desired rotation speed of the engine in accordance with the amplitude of the output voltage $U_{LOAD}$ measured by the voltage sensor and the amplitude of the alternating current $I_{LOAD}$ measured by the current sensor. The first modulating element 172 modulates the speed of the engine according to the desired rotation speed of the engine. The second calculating element 173 determines the slip angle $\theta_{slip}$ according to the rotation speed $\omega_r$ of the rotor measured by the speed sensor. The third calculating element 174 determines the target voltage of the rotor Urq* according to the amplitude of the output voltage $U_{LOAD}$. The second modulating element 175 receives the target voltage of the rotor Urq* and the slip angle $\theta_{slip}$, generates a modulating signal according to the target voltage of the rotor Urq* and the slip angle $\theta_{slip}$, and modulates the frequency and the amplitude of the current in the plurality of symmetric phase windings of the rotor. These functional modules of the excitation control device can be implemented by logic circuits such as CMOS (Complementary Metal Oxide Semiconductor), ASIC (Application Specific Integrated Circuits), PGA (Programmable Gate Array) and FPGA (Field-Programmed Gate Array).

When the excitation control device collects the measured operation data, load power $P_{load}$ is calculated using equation 1 below:

$$P_{load}=U_{SAB}*I_{SAB} \qquad \text{Equation 1}$$

Where $U_{SAB}$ is the amplitude of the measured output voltage and $I_{SAB}$ is the amplitude of the measured load current. In accordance with some embodiments, a desired rotation speed of the engine can be determined using the pre-defined characteristic curve of the engine. The characteristic curve of the engine is a curve indicating a relationship of operation parameters of the engine, for example, the power, rotation torque and rotation speed of the engine. The characteristic curve can be obtained with experiments and pre-stored in the excitation control device. For a certain load, the excitation control device identifies the corresponding desired rotation speed on the characteristic curve of the engine. In some embodiments, the characteristic curve can also be a table or a formula describing the corresponding relationships between the load and the optimal rotation speed (sometimes with other parameters such as desired voltage as well). When the desired rotation of the engine is available, the excitation control device can adjust the rotation speed of the engine by using the desired rotation speed with a closed loop to optimize fuel consumption in response to load changes.

A slip angle $\theta_{slip}$ can be determined using equations 2 and 3 below:

$$\omega_{slip}=\omega_1-\omega_r \qquad \text{Equation 2}$$

$$\theta_{slip}=\int\omega_{slip} \qquad \text{Equation 3}$$

Where $\omega_r$ is the rotation speed of the rotor, and $\omega_1$ is the synchronous speed of the alternator.

In the control strategy illustrated in FIG. 11, a voltage sensor and a current sensor respectively measure the output voltage $U_{SAB}$ and the load current $I_{SAB}$ output by the single phase winding of the stator. A speed sensor measures the rotation speed of the rotor. The excitation control device (or ECM) calculates the load power with the equation of $P_{load}=U_{SAB}*I_{SAB}$, and determines the desired engine speed according to the load power $P_{load}$. The excitation control device modulates the engine speed according to the desired rotation speed of the engine with a close control loop. The excitation control device determines the slip angle $\theta_{slip}$ at least according to the rotation speed of the rotor, and the target voltage of the rotor Urq* at least according to the measured amplitude of the output voltage. Then the excitation control device generates a modulating signal according to the target voltage of the rotor Urq* and the slip angle $\theta_{slip}$, and modulates the frequency and the amplitude of the current in the phase windings of the rotor with the modulating signal. It should be noted that the control strategy illustrated in FIG. 11 is also applicable to an apparatus that outputs a live to neutral voltage from the stator side.

Figure 12:
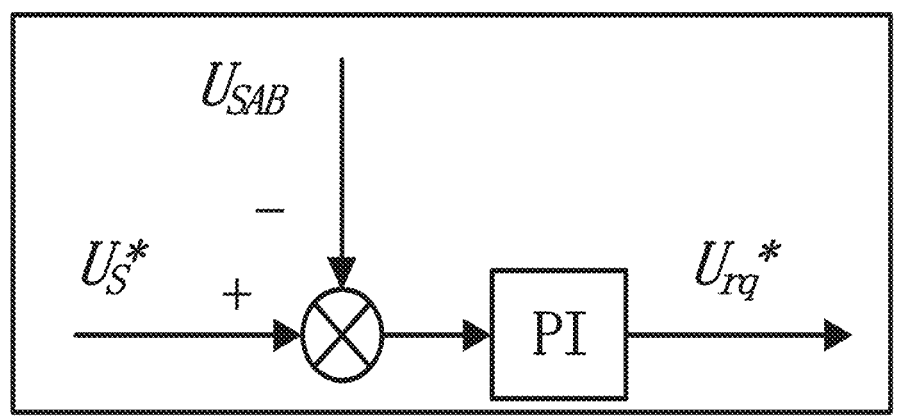
FIG. 12 is schematic diagram of a control loop of the stator voltage in accordance with some embodiments.

FIG. 12 is schematic diagram of a control loop of the stator voltage in accordance with some embodiments. A closed control loop is used to automatically correct the amplitude of the target voltage of the rotor so that the amplitude of the output voltage is kept constant. A Proportional-Integral (PI) regulator is provided in the closed control loop to reduce errors of the target voltage of the rotor. The output voltage $U_{SAB}$, which is a negative feedback, and the target voltage of the stator Us* work as inputs of the PI regulator. The output of the PI regulator is the target voltage of the rotor Urq*. The obtained slip angle $\theta_{slip}$ and target voltage of the rotor Urq* are used by the excitation control device to generate a pulse signal with a certain duty ratio, which is input into the inverter as illustrated in FIG. 10A to regulate the switch ON and OFF time of the switching elements of the inverter. The inverter regulates the amplitude and frequency of the current flowing in the rotor windings. Thereby the intensity of the rotating magnetic field established in the rotor windings and the rotating speed of the rotating magnetic field relative to the rotor are regulated so that the amplitude and frequency of the induced voltage generated in the stator winding are regulated accordingly.

Figure 13:
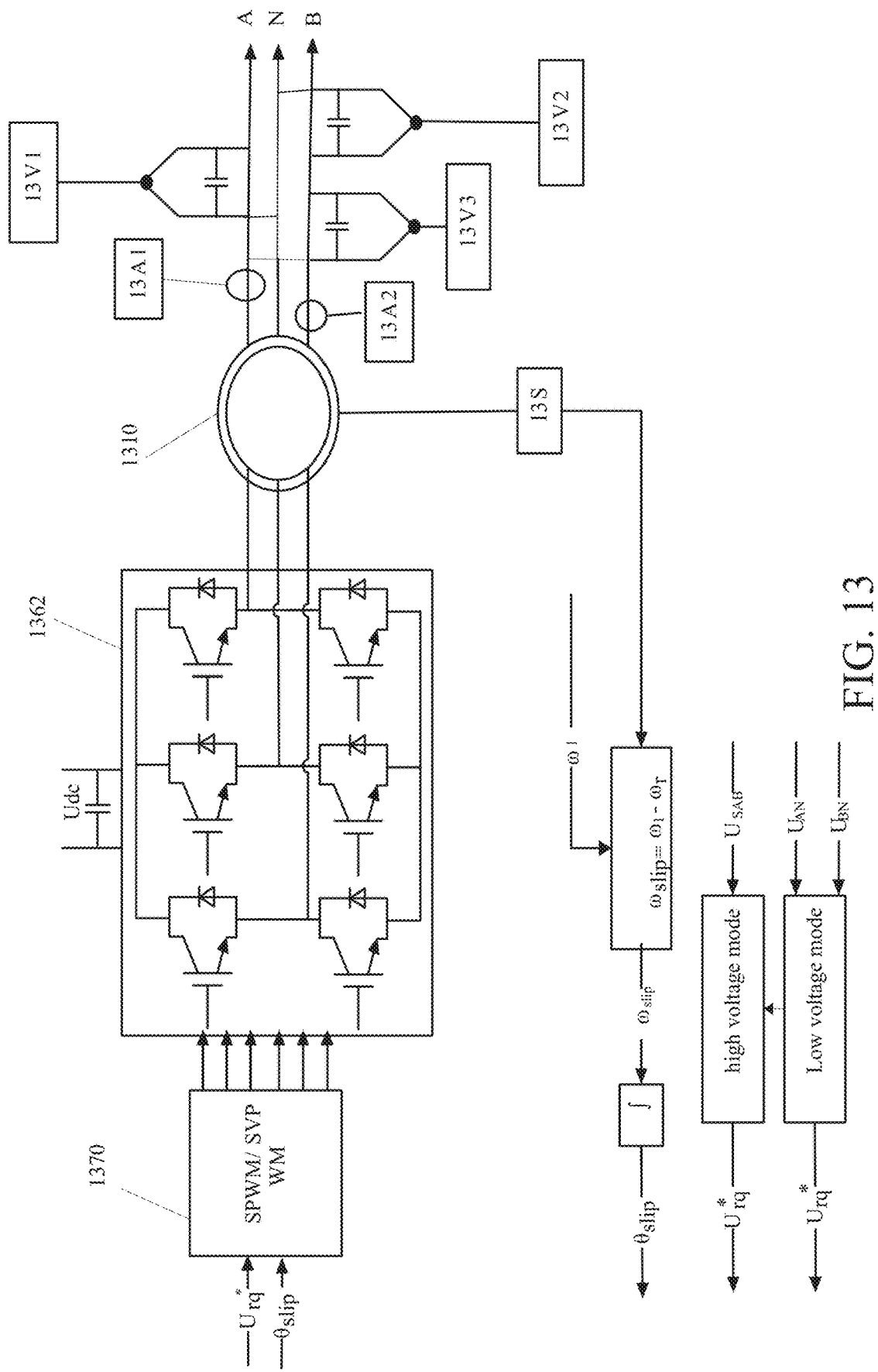
FIG. 13 illustrates another control system for implementing another control strategy in accordance with some embodiments.
Figure 14A:
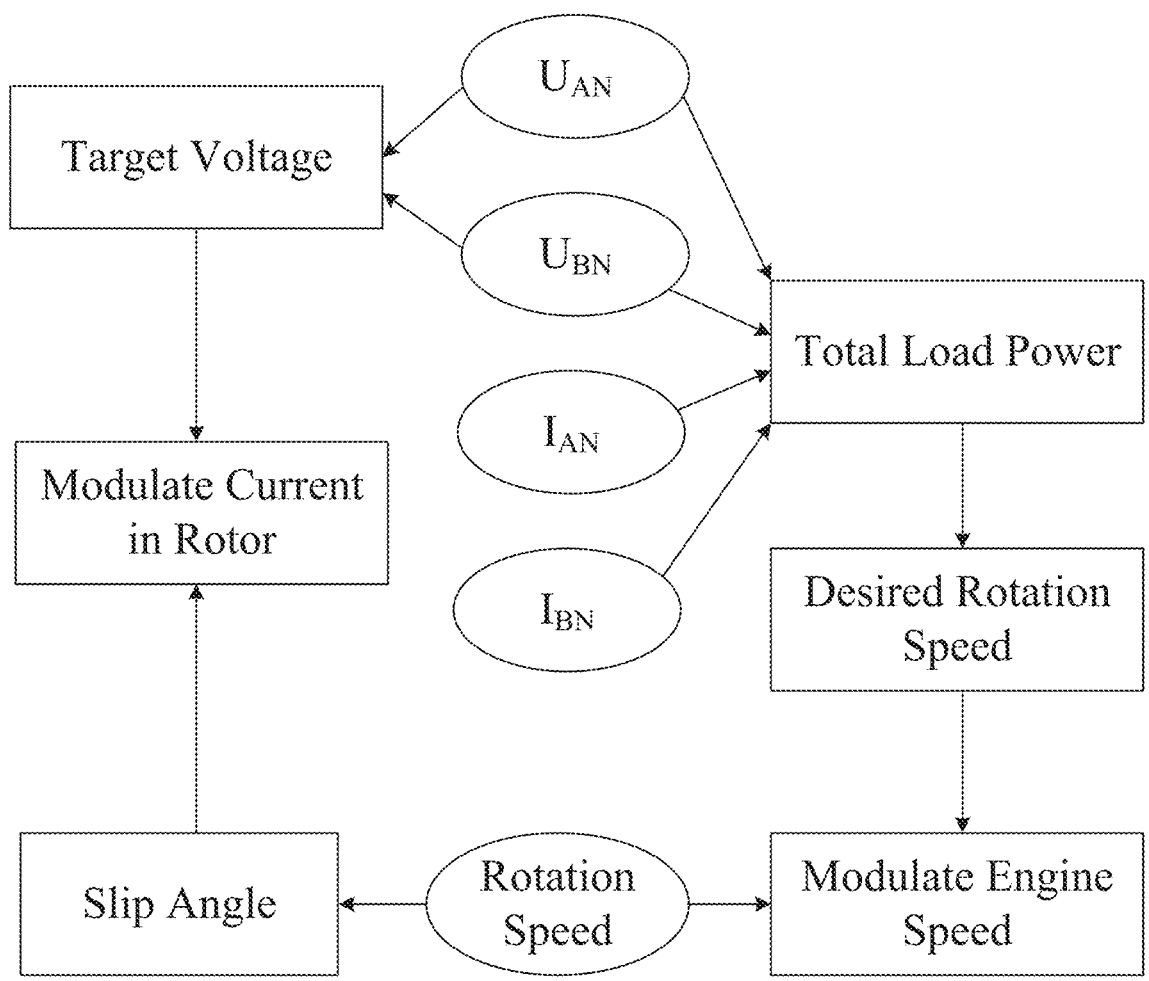
FIGS. 14A and 14B are flowcharts of another control strategy corresponding to the control system in FIG. 13 in accordance with some embodiments.
Figure 14B:
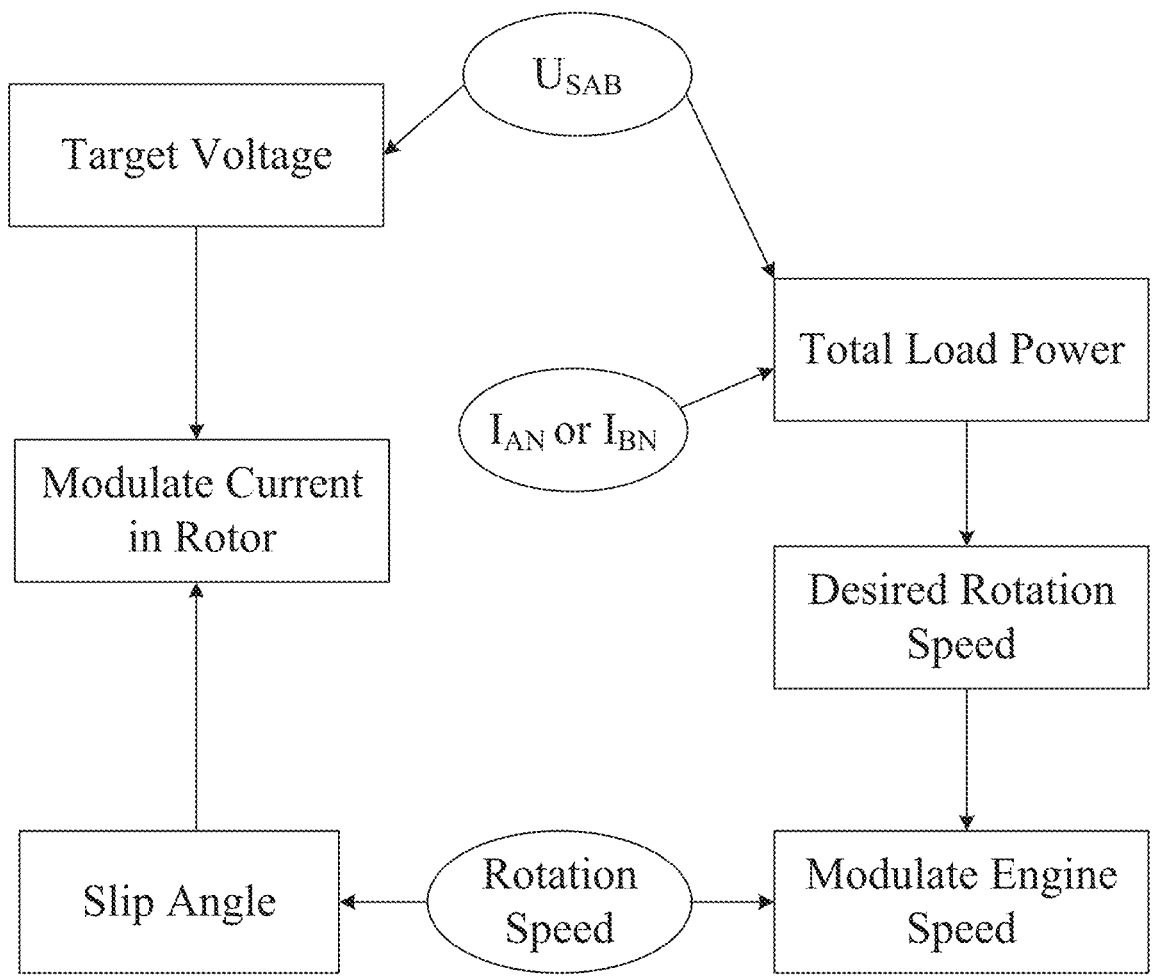
Figure 15:
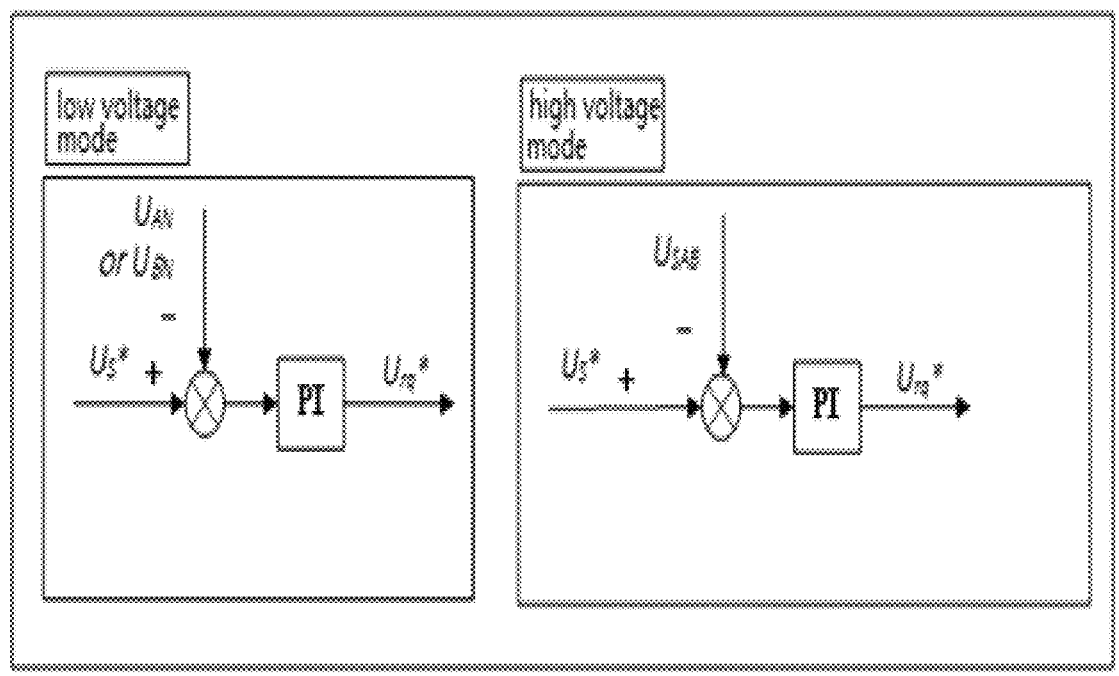
FIG. 15 is schematic diagram of a control loop of the stator voltage in accordance with some embodiments.

Another control strategy is also applicable to the power generating apparatus for providing an output voltage at dual level to an electrical load in accordance with some embodiments. FIG. 13 illustrates another control system for implementing another control strategy in accordance with some embodiments. FIG. 14 is a flowchart of another control strategy corresponding to the control system in FIG. 13. FIG. 15 is schematic diagram of a control loop of the stator voltage in accordance with some embodiments. The differences between this control system and the previous one illustrated in FIGS. 10-12 are as follows.

As illustrated in FIG. 13, the single phase winding of the stator outputs to the electrical load a dual output voltage, i.e., a high voltage and a low voltage, through live terminal lines A, B and neutral terminal line N. The high voltage is live to live voltage $U_{SAB}$, and the low voltage is live to neutral voltage $U_{AN}$ and $U_{BN}$. A user can switch over the switch as described previously to select the high voltage or the low voltage. The switching over signal can be delivered to the excitation device 1370 via a signal line or wireless communications devices such as WIFI devices. The excitation device 1370 selects the high voltage or the low voltage responsive to the switching over signal it receives. A first current sensor 13A1 and a second current sensor 13A2 are provided to measure the first live to neutral current $I_{BN}$ and the second live to neutral current $I_{AN}$. Likewise, a first voltage sensor 13V1 and a second voltage sensor 13V2 are provided to measure the first live to neutral voltage $U_{BN}$ and the second live to neutral voltage $U_{AN}$. Additionally, a third voltage sensor 13V3 is provided to measure the high voltage $U_{SAB}$.

When the apparatus operates in the low voltage mode, the first and the second live to neutral load powers $P_{load\ AN}$, $P_{load\ BN}$ are calculated using equations 4 and 5 below:

$$P_{load\ AN}=U_{AN}*I_{AN} \quad \text{Equation 4}$$

$$P_{load\ BN}=U_{BN}*I_{BN} \quad \text{Equation 5}$$

Where $U_{AN}$ and $U_{BN}$ are the amplitudes of the measured live to neutral output voltages, and $I_{AN}$ and $I_{BN}$ are the amplitude of the measured load current. Then the total power $P_{load}$ total is calculated with equation 6 below:

$$P_{load\ total}=P_{load\ AN}+P_{load\ BN} \quad \text{Equation 6}$$

Where $P_{load\ AN}$ and $P_{load\ BN}$ are the first and second live to neutral load powers. The excitation device then determines the desired engine speed in accordance with the total power $P_{load\ total}$.

When the apparatus operates in the high voltage mode, a load power $P_{load}$ is calculated using equation 7 below:

$$P_{load}=U_{SAB}*I_{AN} \quad \text{Equation 7}$$

Where $U_{SAB}$ is the amplitude of the measured output voltage and IAN is the amplitude of the measured load current. $I_{BN}$ can be used to replace $I_{AN}$ in equation 7 since $I_{AN}$ and $I_{BN}$ are equal in the high voltage mode. The excitation device then obtains the desired engine speed in accordance with the load power $P_{load}$.

In accordance with some embodiments, the control strategy distinguishes the working mode of the system. The system may operate in a high voltage mode and a low voltage mode. FIG. 14A and FIG. 14B respectively illustrate the flowcharts of the low voltage mode and the high voltage mode. The excitation control device receives a working mode signal from the switch. The working mode signal indicates whether the apparatus is working on the high voltage mode or low voltage mode. One or more voltage sensors measure the amplitudes of the low voltage $U_{AN}$ and $U_{BN}$, the high voltage $U_{SAB}$, One or more current sensors measure the live to neutral current $I_{AN}$ and $I_{BN}$. A speed sensor measures the rotation speed of the rotor. In the low voltage mode as illustrated in FIG. 14A, the excitation control device calculates the total load power with the equation of $P_{load\ total}=U_{AN}*I_{AN}+U_{BN}*I_{BN}$, and determines the desired engine speed according to the total load power $P_{load\ total}$. The excitation control device (or ECM) modulates the engine speed according to the desired rotation speed of the engine with a close control loop. The excitation control device determines the slip angle $\theta_{slip}$ according to the rotation speed of the rotor, and the target voltage of the rotor Urq* according to the amplitude of the measured low voltage $U_{AN}$ or $U_{BN}$. Then the excitation control device generates a modulating signal according to the target voltage of the rotor Urq* and the slip angle $\theta_{slip}$, and uses the modulating signal to modulate the frequency and the amplitude of the current in the phase windings of the rotor. FIG. 14B illustrates the flowchart of the high voltage mode. The excitation control device calculates the load power with the equation of $P_{load}=U_{SAB}*I_{AN}$. In some embodiments, $I_{BN}$ can be used to replace $I_{AN}$ since $I_{AN}$ and $I_{BN}$ are equal in the high voltage mode. Then the excitation control device obtains the desired engine speed according to the load power $P_{load}$. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* according to the amplitude of the measured high voltage $U_{SAB}$. Then the excitation control device generates a modulating signal according to the target voltage of the rotor Urq* and the slip angle $\theta_{slip}$. The excitation control device uses the modulating signal to modulate the frequency and the amplitude of the current in the phase windings of the rotor.

FIG. 15 is schematic diagram of a control loop of the stator voltage in accordance with some embodiments. This control loop switches between two modes, a high voltage mode and a low voltage mode. In the high voltage mode, the high output voltage $U_{SAB}$ is set as a negative feedback input to the PI regulator. The target voltage of the stator Us* serves to correct the high output voltage $U_{SAB}$ in the PI regulator. The output of the PI regulator is the target voltage of the rotor Urq*. In the low voltage mode, the low output voltage $U_{AN}$ or $U_{BN}$ is set as a negative feedback input to the PI regulator. The target voltage of the stator Us* serves to correct the low output voltage $U_{SAB}$ in the PI regulator. The output of the PI regulator is also the target voltage of the rotor Urq* in the low voltage mode. The obtained slip angle and target voltage of the rotor are then used by the excitation control device to generate a pulse signal. Other features in this control system are similar to those described previously with reference to FIGS. 10-12, and therefore will not be discussed again herein.

Figure 16:
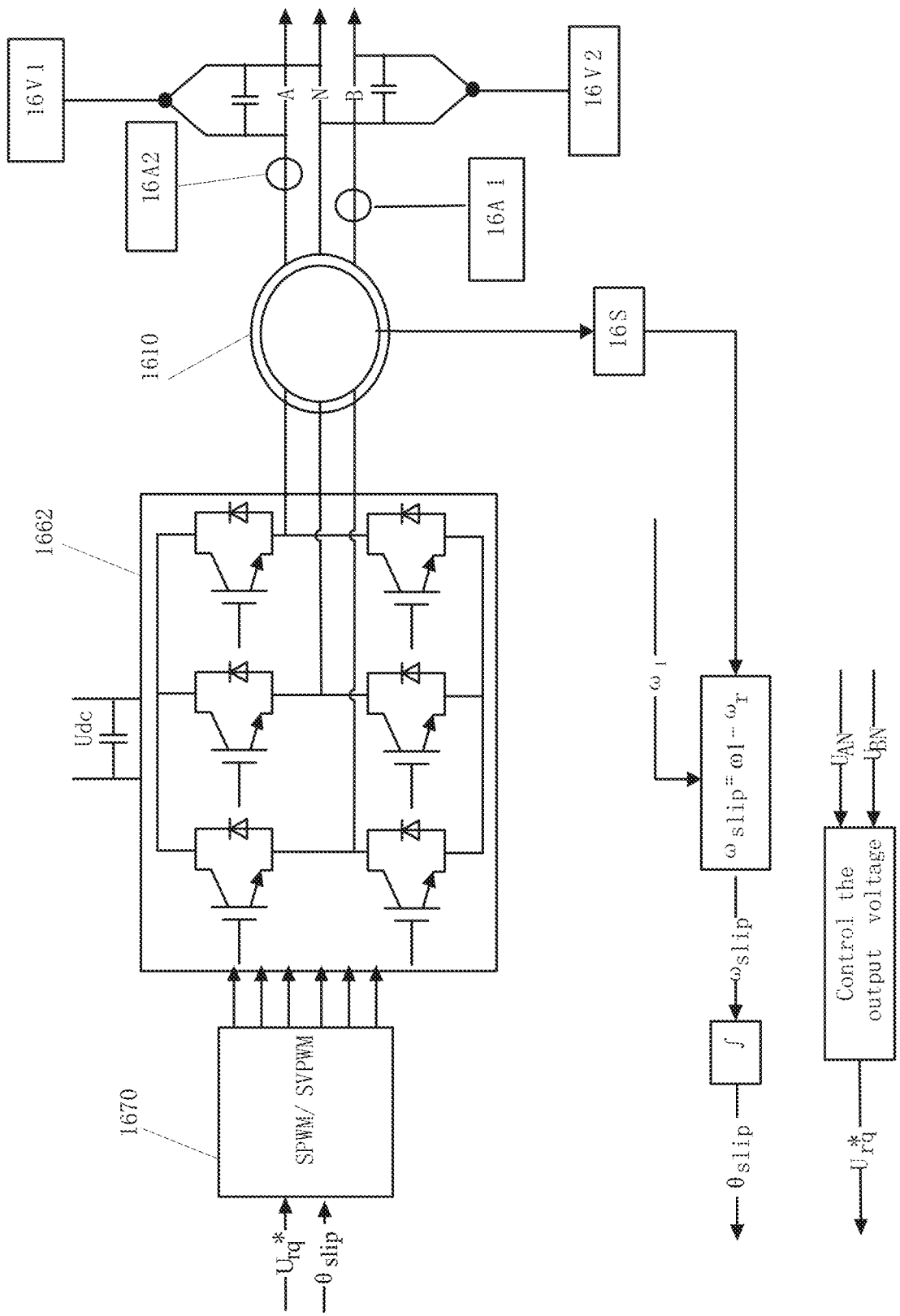
FIG. 16 illustrates another control system for an off-grid power generating apparatus in accordance with some embodiments.
Figure 17:
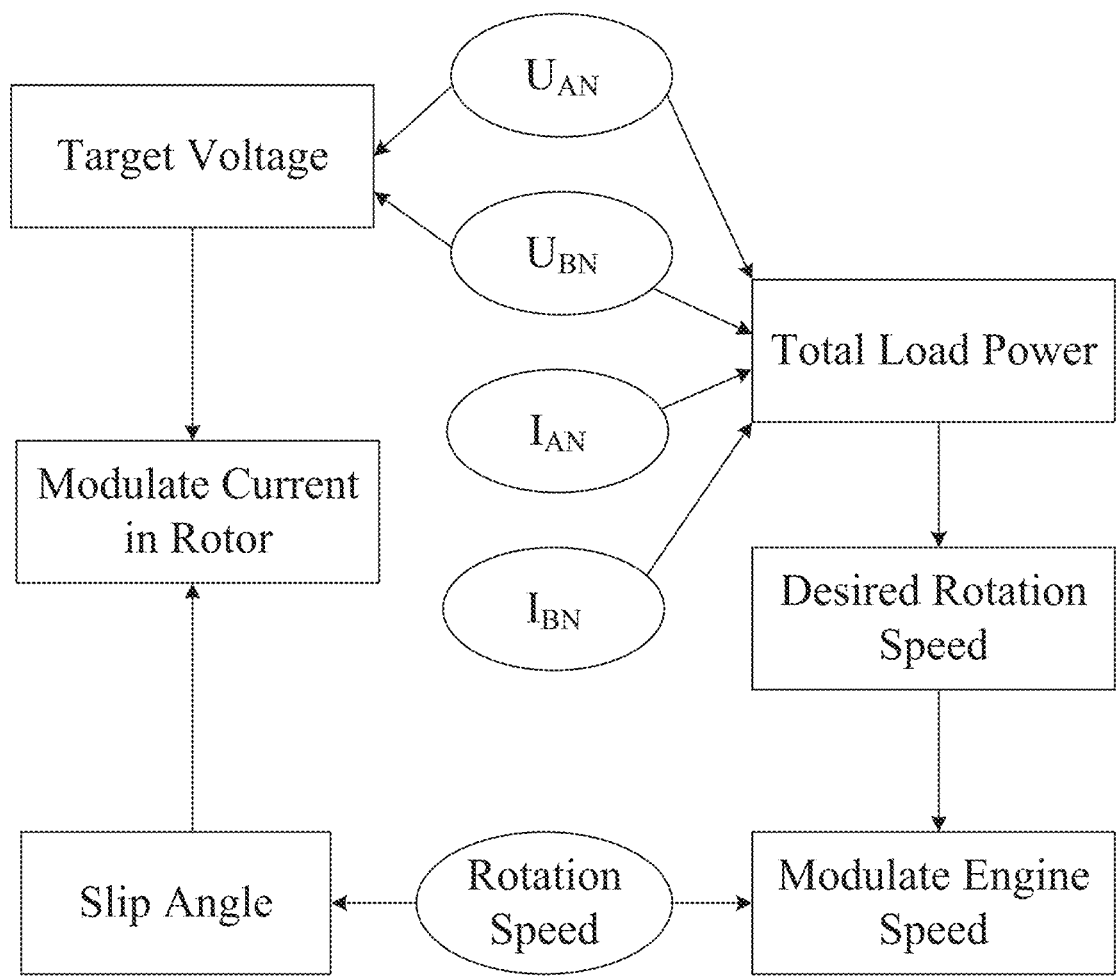
FIG. 17 is a flowchart of a control strategy corresponding to the control system illustrated in FIG. 16 in accordance with some embodiments.
Figure 18:
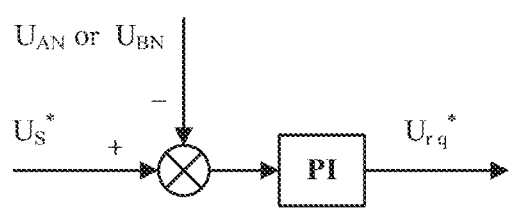
FIG. 18 is schematic diagram of a control loop of the stator voltage in accordance with some embodiments.

FIG. 16 illustrates another control system for an off-grid power generating apparatus in accordance with some embodiments. FIG. 17 is a flowchart of a control strategy corresponding to the control system illustrated in FIG. 16 in accordance with some embodiments. FIG. 18 is schematic diagram of a control loop of the stator voltage in accordance with some embodiments. As illustrated in FIG. 16, the stator winding delivers to the load a live to live voltage $U_{SAB}$, i.e., the high voltage, via live line A and B, and a live to neutral voltage $U_{AN}$ or $U_{BN}$, i.e., low voltage, via live line A or B and neutral line N. A user can switch over the switch to select the high voltage or the low voltage. Unlike the embodiments illustrated in FIGS. 13-15, the excitation control device 1670 employs the same control strategy in these embodiments, no matter whether the apparatus operates in the high voltage mode or the low voltage mode. Thus, switching signals from the switch are not needed for monitoring the apparatus in these embodiments. A first current sensor 16A1 and a second current sensor 16A2 are provided to measure the first live to neutral current $I_{BN}$ and the second live to neutral current $I_{AN}$. Likewise, a first voltage sensor 16V1 and a second voltage sensor 16V2 are provided to measure the first live to neutral voltage $U_{BN}$ and the second live to neutral voltage $U_{AN}$. The live to live voltage is not needed for implementing the control strategy in these embodiments.

In accordance with some embodiments, the voltage sensor and the current sensor measure the amplitudes of the live to neutral output voltage $U_{AN}$ and $U_{BN}$ and the load current $I_A$n and $I_{BN}$ in the control strategy illustrated in FIG. 17. The speed sensor measures the rotation speed of the rotor. Then the excitation control device calculates the total load power $P_{load\ total} = U_{AN} * I_{AN} + U_{BN} * I_{BN}$, and obtains the desired speed of the engine according to the total load power. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* at least according to the measured amplitude of the Live to neutral output voltage $U_{AN}$ or $U_{BN}$. Then the excitation control device generates a modulating signal according to the target voltage of the rotor Urq* and the slip angle $\theta_{slip}$, and modulates the frequency and the amplitude of the current in the phase windings of the rotor with the modulating signal.

In accordance with some embodiments, no matter whether the apparatus operates in the high voltage mode or the low voltage mode, the load power of the apparatus is calculated with equation 8 below:

$$P_{load}\text{total} = U_{AN} * I_{AN} + U_{BN} * I_{BN} \qquad \text{Equation 8}$$

Where $U_{AN}$ and $U_{BN}$ are the first live to neutral voltage and the second live to neutral voltage, and $I_{AN}$ and $I_{BN}$ are the first live to neutral current and the second live to neutral current. The excitation device then determines the desired engine speed in accordance with the load power $P_{load\ total}$.

FIG. 18 is schematic diagram of a control loop of the stator voltage in accordance with some embodiments. Unlike the embodiments illustrated in FIGS. 13-15, the control loop of the stator voltage in the embodiments does not switch over between the high voltage mode and the low voltage mode. Rather, the control loop of the stator voltage just employs the live to neutral voltage $U_{AN}$ or $U_{BN}$ as a negative feedback input to the PI regulator. The target voltage of the stator Us* serves as another input of the PI regulator to correct the live to neutral voltage $U_{AN}$ or $U_{BN}$. The output of the PI regulator is the target voltage of the rotor Urq*. The obtained slip angle and target voltage of the rotor are used by the excitation control device to generate a pulse signal with a certain duty ratio, which is input into the inverter 1662 illustrated in FIG. 16 to regulate the switch ON and OFF time of the switching elements of the inverter. The inverter 1662 regulates the amplitude and frequency of the current flowing in the rotor windings. Thereby the intensity of the rotating magnetic field established in the rotor windings and the rotating speed of the rotating magnetic field relative to the rotor are regulated corresponding to the changes of the engine speed. The output voltage generated in the stator windings is kept constant accordingly. Only the live to neutral voltage of the stator is monitored in the embodiments illustrated in FIGS. 16-18 and the excitation control device does not need to communicate with the switch to obtain its operating mode.

It should be noted that the operations illustrated in FIGS. 11, 14 and 17 can be implemented in an order different from the order illustrated in these figures. Some operations can be conducted substantially simultaneously or in a reverse order, depending on the functions achieved by the operations. For example, the operation of determining the target voltage of the rotor can be conducted after or at the same time as the operation of measuring the rotating speed of the rotor is implemented.

Figure 19:
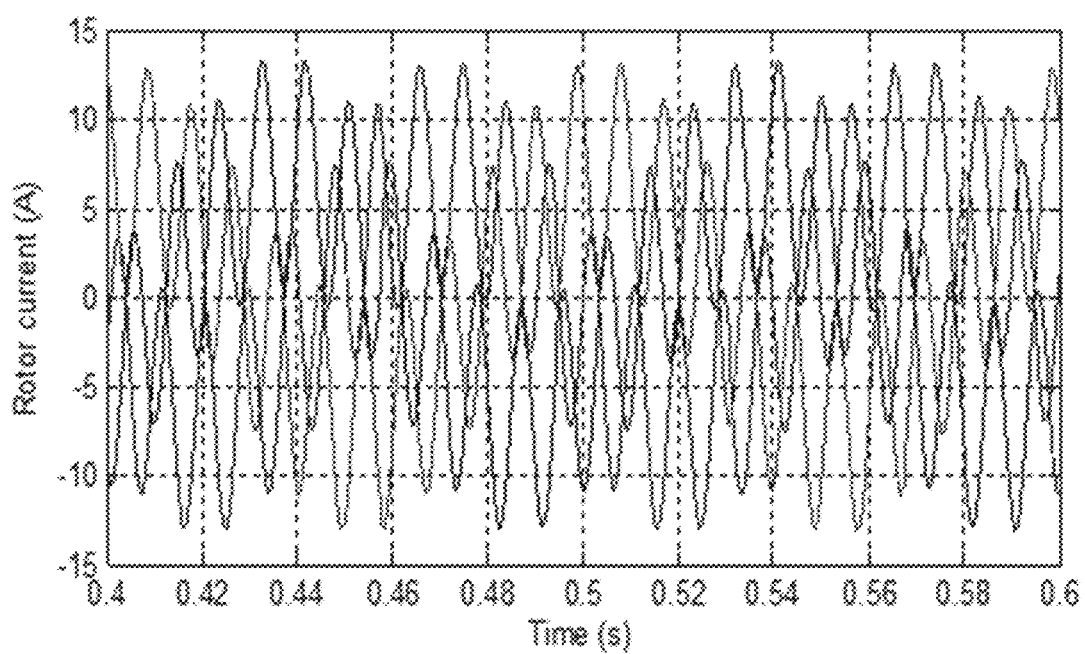
FIG. 19 illustrates a waveform of an excitation current of the rotor in accordance with some embodiments.
Figure 20:
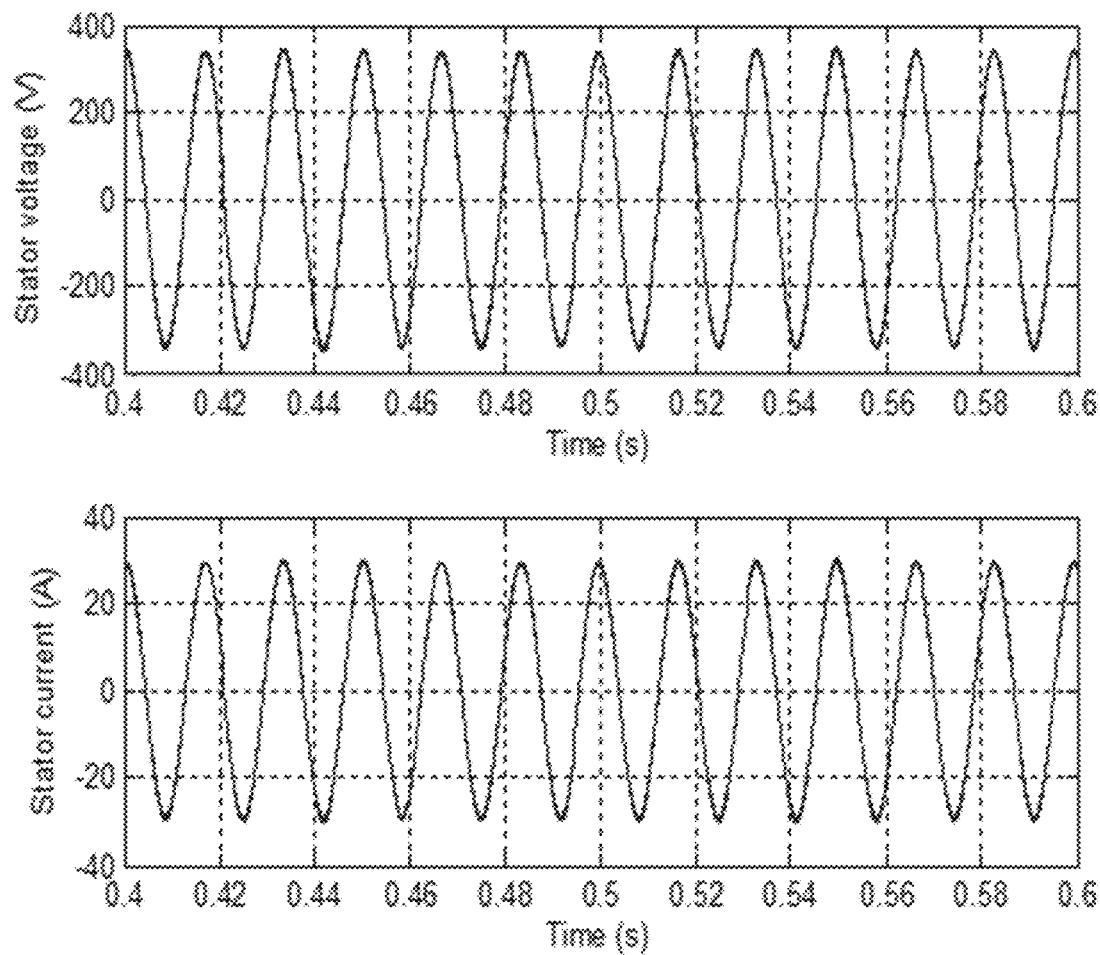
FIG. 20 illustrates a waveform of a current and a waveform of a voltage output by the apparatus in accordance with some embodiments.

A meter for measuring the angular position of the rotor such as an encoder, which is typically expensive, is not used in the control system described above. Further, a current control loop, which is usually involved in vector control methods, is not used in the system. The system is therefore simple and easy to implement by the excitation control device. As a result, a controlling system with a low capability can be used as the excitation control device, which reduces the cost of the power generating apparatus. FIG. 19 illustrates a waveform of an excitation current for establishing a magnetic field in the rotor windings in accordance with some embodiments. This waveform is achieved by an apparatus with a single phase stator winding and three phase rotor windings which operates at 3000 rpm and outputs 240 volt voltage from the stator side and is applied with a resistive load of 5 kw (kilowatt). FIG. 20 illustrates a waveform of a current and a waveform of a voltage output from the stator side of the apparatus in accordance with some embodiments. The waveforms are achieved by an apparatus having a stator with a single phase winding. The apparatus operates at a speed of 3000 rpm and outputs a voltage of 240 volts from the stator side. A resistive load of 5 kw is applied to the apparatus. FIGS. 19 and 20 clearly indicate that the control system yields satisfactory waveforms.

The various embodiments disclosed above have many advantages. The apparatus has a stator with a single winding and a rotor with a plurality of symmetric windings. The combination of a stator with a single winding and a rotor with a plurality of symmetric phase windings enables the apparatus to power single phase electrical devices with small rated powers such as household appliances while keeping the control of the apparatus simple and easy.

The power generating apparatus outputs electrical power directly from the stator without any frequency conversion. Unlike a generator with an AC-DC-AC converter regulating the full power (overall power) of the generator, the apparatus merely regulates a fraction of its full power with an inverter. The inverter regulates the amplitude and frequency of the excitation current in the rotor windings for compensating for the variation tendency of the induced voltage that is generated in the stator winding. In this manner, the amplitude and frequency of the output voltage of the apparatus are kept stable. It is estimated that the rated power of a power converter disposed on the rotor side of a power generating apparatus accounts for merely around 10% of the rated output power of the power generating apparatus. Thus, an inverter with a lower rated capacity can be used in the apparatus.

The inverter applies an AC voltage to the plurality of phase windings of the rotor for establishing a rotating magnetic field. Both the amplitude and the frequency of the excitation voltage are controllable with an AC voltage serving as the excitation voltage. This is advantageous given that only the amplitude of the excitation voltage is controllable when a DC voltage is used as the excitation voltage.

The operation speed of the engine in the apparatus is desirably adjustable to maximize fuel efficiency, and thus reduces $CO_2$ emissions, of the engine for a given load. Optimizing the operating speed of the engine corresponding to a given load also reduces the noise associated with operation of the engine-driven apparatus and extends the life of the engine. The output voltage from the stator is substantially kept at a constant frequency, e.g., 60 Hz, since an excitation voltage is imposed on the rotor windings to establish a magnetic field for compensating for the speed variations of the engine.

The output voltage provided by the apparatus is stable given that a closed voltage loop is employed to determine the target rotor voltage for regulating the intensity of the rotating magnetic field. With this feature, the apparatus can be utilized to power electrical devices such as audio and video players and some scientific instruments that are sensitive to voltage and frequency instability. Furthermore, the apparatus can provide a dual voltage simultaneously with a single phase winding so that users can use the apparatus to power electrical devices with different nominal voltages.

The apparatus is set to operate at a speed equal to or less than the synchronous speed of the alternator, which means that electrical energy flows unidirectionally, i.e., from the stator to the rotor, not vice visa. This feature renders cheap devices such as uncontrolled bridge rectifier applicable to the apparatus. The feature also makes it possible to control the apparatus with a simple and easy control strategy. Devices with a comparatively low capability can also be used in the apparatus.

The above is only the preferred embodiments of the application and not intended to limit the application, and any modifications, equivalent replacements, improvements and the like within the spirit and principle of the application shall fall within the scope of protection of the application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the application and its practical applications, to thereby enable others skilled in the art to best utilize the application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An off-grid power generating apparatus for powering an electrical load, comprising:
   an engine;
   an alternator including:
   a rotor coaxially coupled to the engine, the rotor including a plurality of symmetric phase windings;
   a stator with a single phase winding configured to generate an induced voltage;

one or more sensors configured to measure operation data of the apparatus;

an excitation control device operatively connected to the engine and the alternator and configured to:

control the induced voltage generated in the single phase winding of the stator to make the induced voltage have a predetermined frequency by regulating the rotating magnetic field generated in the phase windings of the rotor; and calculate load power of the electrical load in accordance with at least the operation data measured by the one or more sensors, and regulate speed of the engine responsive to the calculated load power, and an electrical circuit connecting the single phase winding of the stator and the electrical load, wherein the electrical circuit is configured in a way that the induced voltage generated in the single phase winding and an output voltage applied to the electrical load are at the same frequency;

wherein the single phase winding of the stator applies an excitation voltage to the plurality of symmetric phase windings of the rotor, and the alternator further comprises a frequency conversion device, wherein the frequency conversion device comprises:

a direct current bus voltage regulator operatively connected with the single phase winding of the stator, the direct current bus voltage regulator being configured to receive and rectify the excitation voltage from the single phase winding of the stator, and output a rectified direct current bus voltage; and an inverter operatively connected with the direct current bus voltage regulator, the inverter being configured to receive the rectified direct current voltage, and supply an alternating current voltage to the plurality of symmetric phase windings of the rotor for establishing the rotating magnetic field.

2. The apparatus of claim 1, wherein the direct current bus voltage regulator is an uncontrolled bridge rectifier or a power factor corrector.

3. The apparatus of claim 1, wherein the one or more sensors further comprising:

a voltage sensor configured to measure an amplitude of the output voltage applied to the electrical load;

a current sensor configured to measure an amplitude of an alternating current applied the electrical load; and a speed sensor configured to measure a rotation speed of the rotor.

4. The apparatus of claim 3, wherein the excitation control device includes:

a first calculating element configured to determine a desired rotation speed of the engine in accordance with at least the amplitude of the output voltage measured by the voltage sensor and the amplitude of the alternating current measured by the current sensor;

a first modulating element configured to modulate the speed of the engine in accordance with the desired rotation speed of the engine;

a second calculating element configured to determine a slip angle in accordance with at least the rotation speed of the rotor measured by the speed sensor; and a third calculating element configured to determine a target voltage of the rotor in accordance with at least the amplitude of the output voltage measured by the voltage sensor; and a second modulating element configured to receive the slip angle and the target voltage of the rotor, generate a modulating signal in accordance with at least the target voltage of the rotor and the slip angle, and modulate a frequency and an amplitude of an excitation current in the plurality of symmetric phase windings of the rotor.

5. The apparatus of claim 4, wherein the first modulating element is configured to modulate the speed of the engine with a closed control loop.

6. The apparatus of claim 4, wherein the third calculating element is configured to determine the target voltage of the rotor with a closed control loop.

7. The apparatus of claim 4, wherein the second modulating element is configured to generate the modulating signal in the form of a pulse signal, and the pulse signal is used to control switching time of a switch of the inverter.

8. The apparatus of claim 1, wherein the apparatus is set to operate at a speed equal to or less than a synchronous speed of the alternator.

9. An off-grid portable generator set for powering an electrical load, comprising:

an engine; and an induction asynchronous alternator including;

a rotor driven by the engine, the rotor including a plurality of symmetric phase windings;

a stator with a single phase winding, the single phase winding being configured to generate an induced voltage, and one or more sensors configured to measure operation data of the generator set; and an excitation control device operatively connected to the engine and the alternator and configured to:

control the induced voltage generated in the single phase winding of the stator to make the induced voltage have a predetermined frequency by regulating the rotating magnetic field generated in the phase windings of the rotor, and calculate load power of the electrical load in accordance with at least the operation data measured by the one or more sensors, and regulate speed of the engine responsive to the calculated load power, wherein the single phase winding of the stator is connected with the electrical load via a circuit configured in a way that the induced voltage generated in the single phase winding and an output voltage applied to the electrical load are at the same frequency;

wherein the single phase winding of the stator applies an excitation voltage to the plurality of symmetric phase windings of the rotor, and the alternator further comprises a frequency conversion device, wherein the frequency conversion device comprises:

a direct current bus voltage regulator operatively connected with the single phase winding of the stator, the direct current bus voltage regulator being configured to receive and rectify the excitation voltage from the single phase winding of the stator, and output a rectified direct current bus voltage; and an inverter operatively connected with the direct current bus voltage regulator, the inverter being configured to receive the rectified direct current voltage, and supply an alternating current voltage to the plurality of symmetric phase windings of the rotor for establishing the rotating magnetic field.

10. The generator set of claim 9, wherein the direct current bus voltage regulator is an uncontrolled bridge rectifier or a power factor corrector.

11. The generator set of claim 9, wherein the one or more sensors further comprising:

a voltage sensor configured to measure an amplitude of the output voltage applied to the electrical load;

a current sensor configured to measure an amplitude of an alternating current applied the electrical load; and a speed sensor configured to measure a rotation speed of the rotor.

12. The generator set of claim 11, wherein the excitation control device includes:

a first calculating element configured to determine a desired rotation speed of the engine in accordance with at least the amplitude of the output voltage measured by the voltage sensor and the amplitude of the alternating current measured by the current sensor; and a first modulating element configured to modulate the speed of the engine in accordance with the desired rotation speed of the engine with a closed control loop.

13. The generator set of claim 11, wherein the excitation control device includes:

a second calculating element configured to determine a slip angle in accordance with at least the rotation speed of the rotor measured by the speed sensor; and a third calculating element configured to determine a target voltage of the rotor in accordance with at least the amplitude of the output voltage measured by the voltage sensor; and a second modulating element configured to receive the slip angle and the target voltage of the rotor, generate a modulating signal in accordance with at least the target voltage of the rotor and the slip angle, and modulate a frequency and an amplitude of an excitation current in the plurality of symmetric phase windings of the rotor with the modulating signal.

14. The generator set of claim 13, wherein the third calculating element is configured to determine the target voltage of the rotor with a closed control loop.

15. The generator set of claim 13, wherein the second modulating element is configured to generate the modulating signal in the form of a pulse signal, and the pulse signal is used to control switching time of a switch of the inverter.

16. The generator set of claim 9, wherein the generator set is set to operate at a speed equal to or less than a synchronous speed of the alternator.

* * * * *